US011049307B2

(12) United States Patent
Gehlaut et al.

(10) Patent No.: US 11,049,307 B2
(45) Date of Patent: Jun. 29, 2021

(54) TRANSFERRING VECTOR STYLE PROPERTIES TO A VECTOR ARTWORK

(71) Applicant: Adobe Inc., San Jose, CA (US)

(72) Inventors: Tarun Gehlaut, Faridabad (IN); Paragi Singhal, Greater Noida (IN); Ayush Bansal, Adarsh Nagar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/998,299

(22) Filed: Aug. 20, 2020

(65) Prior Publication Data

US 2020/0380750 A1 Dec. 3, 2020

Related U.S. Application Data

(63) Continuation of application No. 16/259,861, filed on Jan. 28, 2019, now Pat. No. 10,769,830.

(51) Int. Cl.
*G06T 11/60* (2006.01)
*G06T 11/00* (2006.01)
*G06T 11/40* (2006.01)

(52) U.S. Cl.
CPC ............ *G06T 11/60* (2013.01); *G06T 11/001* (2013.01); *G06T 11/40* (2013.01)

(58) Field of Classification Search
None
See application file for complete search history.

(56) References Cited

U.S. PATENT DOCUMENTS 10,489,946 B1 * 11/2019 Batra ..................... G06T 11/40
10,769,830 B2   9/2020 Gehlaut et al.

2009/0021754 A1 * 1/2009 Cairns ................... G06T 11/001
                                              358/1.9
2018/0165837 A1 * 6/2018 Horn ..................... G06T 11/001
2020/0092610 A1 * 3/2020 Baughman ......... H04N 21/4415
(Continued)

OTHER PUBLICATIONS

"De Casteljau's algorithm—Wikipedia", Retrieved at: https://en.wikipedia.or/wiki/De_Casteljau%27s_algorithm—on Nov. 9, 2018, 5 pages.
(Continued)

*Primary Examiner* — Frank S Chen
(74) *Attorney, Agent, or Firm* — FIG. 1 Patents

(57) ABSTRACT

In implementations of transferring vector style properties to a vector artwork, an artwork editing system directly processes artwork represented by vector graphics, unlike systems that process raster graphics. The artwork editing system transfers vector style properties from shapes of a style vector artwork to shapes of a content vector artwork based on overlapping shapes between the two artworks and in proportion to an amount of the overlap. A user may select vector style properties to transfer, such as fill content, stroke color, stroke width, stroke dashing, etc., and a percentage of the vector style property to transfer. Accordingly, a designer may transfer vector style properties of the designer's selection to a vector artwork efficiently and predictably, in real-time (e.g., without perceptible delay to the designer), without undesired distortions that are commonly introduced by neural networks, and without the cost associated with neural networks.

20 Claims, 13 Drawing Sheets
(8 of 13 Drawing Sheet(s) Filed in Color)

(56) References Cited

U.S. PATENT DOCUMENTS

2020/0242823 A1   7/2020   Gehlaut et al.

OTHER PUBLICATIONS

"Notice of Allowance", U.S. Appl. No. 16/259,861, dated May 8, 2020, 7 pages.
"Scan-line Polygon filling using OPENGL in C", Retrieved at: https://www.geeksforgeeks.org/scan-line-polygon-filling-using-opengl-c/—on Nov. 9, 2018, 13 pages.
"Scanline rendering—Wikipedia", Retrieved at: https://en.wikipedia.org/wiki/Scanline_rendering—Nov. 8, 2018, 4 pages.
Gatys, Leon A. et al., "A Neural Algorithm of Artistic Style", Computer Vision and Pattern Recognition, Sep. 2, 2015, 16 pages.
Li, Yijun et al., "Universal Style Transfer via Feature Transforms", Nov. 17, 2017, 11 pages.

* cited by examiner

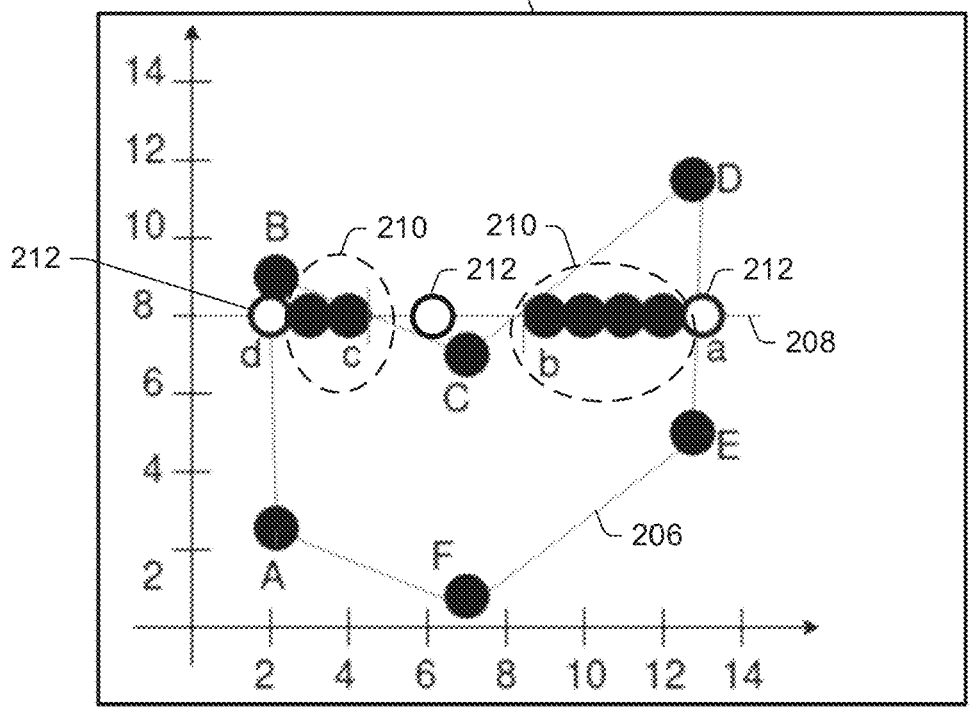
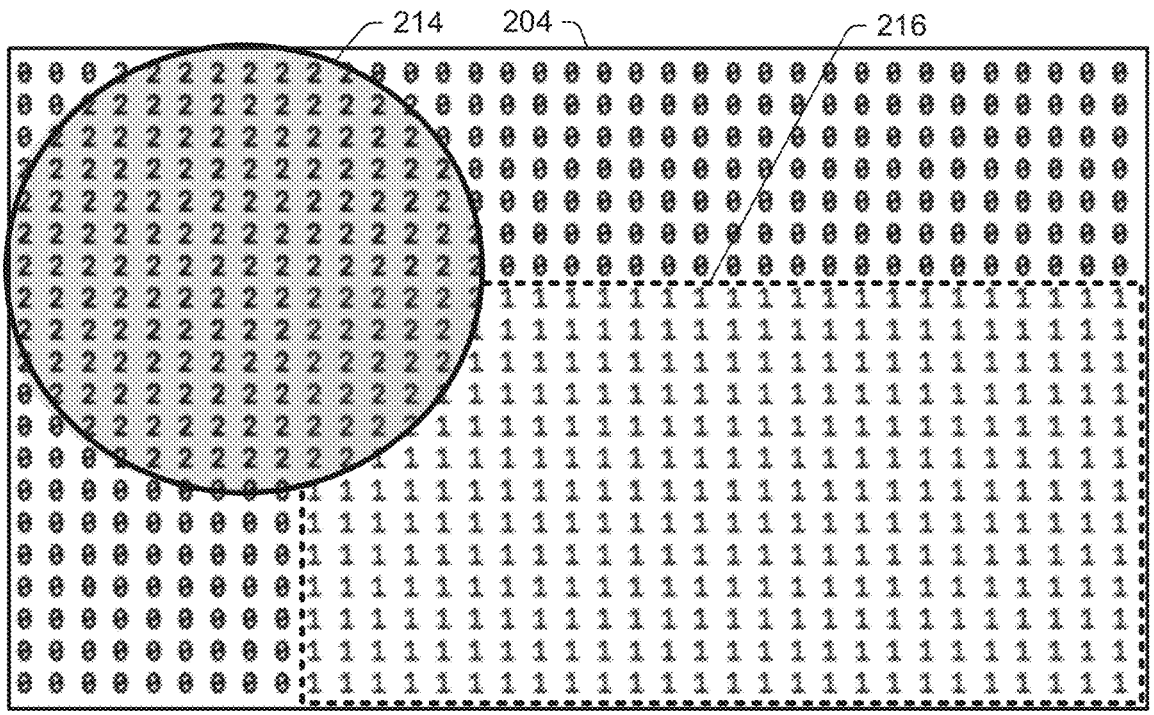
FIG. 2

TRANSFERRING VECTOR STYLE PROPERTIES TO A VECTOR ARTWORK

RELATED APPLICATION

This application is a continuation of and claims priority to U.S. patent application Ser. No. 16/259,861 filed Jan. 28, 2019 entitled "Transferring Vector Style Properties to a Vector Artwork," the disclosure of which is incorporated by reference herein in its entirety.

BACKGROUND

Some image editing applications allow designers to stylize the content of an image based on the style of another image. For instance, the style of a painting done by an artist may be transferred to a logo of a website so that the logo appears on the website as if it was painted by the artist. These image editing applications, however, are limited to images represented by raster graphics, and are not designed to directly process images or artwork represented by vector graphics (e.g., Bezier curves). Unlike vector graphics, raster images suffer from a degradation in quality when the image is scaled in size. Since it is difficult or impossible to transform most raster images to vector graphics, the output of these image editing applications is not easily converted from raster to vector graphics.

To transfer the style of one image to another image, most of these image editing applications rely on a deep learning model, such as a neural network that extracts feature maps from the raster images, combines the feature maps, and generates a raster image from the combined feature maps. Because the neural network is trained using raster images including real-world objects, these image editing applications usually fail when provided vector artworks, since the vector artworks generally include shapes defined by curves that are not recognizable by the trained neural network. These shortcomings are exacerbated for complex vector artworks represented by large numbers of curves (e.g., thousands of curves).

Furthermore, the deep learning models are computationally expensive, requiring significant amounts of training data and time to process the training data. When deployed in an image editing application, the trained model often requires so many calculations that it cannot be implemented without significant processing delay, preventing a real-time experience for the user and making the image editing application frustrating to operate.

Moreover, the deep learning models are generally not robust and produce unpredictable and unacceptable results. For instance, the deep learning models often fail for "unseen" classes of objects that are not included in the training images. These deep learning models may also introduce undesirable distortions in the stylized image, such as loss of information, structural distortion, blurring, direct copying of undesirable features, compression artifacts, and the like.

Because of the advantages of vector graphics over raster graphics (e.g., scalability without loss), some image editing applications directly operate on vector graphics artwork rather than images represented by raster graphics. However, due to the infeasibility of converting raster graphics to vector graphics and the shortcomings of deep learning models used for style transfer as discussed above, these image editing applications do not include functions to transfer the style of one vector artwork to another vector artwork. Accordingly, image editing applications, whether processing images represented by raster graphics or artwork represented by vectors, are not suitable to transfer the style of one vector artwork to the content of another artwork.

SUMMARY

Techniques and systems are described to transfer vector style properties from one vector artwork to another vector artwork efficiently, predictably, and quickly, e.g., without perceptible delay to a user. Rather than rely on a neural network to extract and combine feature maps from images represented by raster graphics, an artwork editing system directly processes artwork represented by vector graphics to transfer vector style properties from one vector artwork to another vector artwork. Accordingly, the artwork editing system accepts and produces vector artworks that are editable by image editing applications that process vector artworks. The artwork editing system generates respective style maps for a content vector artwork and a style vector artwork, and uses the style maps to transfer vector style properties from the style vector artwork to content (e.g., shapes) in the content vector artwork. A style map includes shape designators and vector style properties for shapes designated by the shape designators for cells (e.g., pixels) of an image representing the vector artwork. Vector style properties for a shape can include a fill color, a fill opacity, a fill pattern, a stroke width, a stroke color, a stroke opacity, a stroke dashing, gradient parameters, properties for a shadow, and the like.

The artwork editing system overlays the style vector artwork on the content vector artwork, and using the style maps determines, for each shape in the content vector artwork, shapes of the style vector artwork that overlap the shape in the content vector artwork and an amount of area of the shape overlapped by each of the shapes of the style vector artwork. The artwork editing system determines vector style properties to transfer to the shape of the content vector artwork based on vector style properties of the shapes of the style vector artwork that overlap the shape of the content vector artwork. The vector style properties transferred to the shape of the content vector artwork are based on the amount of area of the shape of the content vector artwork overlapped by the shapes of the style vector artwork. For instance, the artwork editing system can determine a fill color for a shape of a content vector artwork by averaging the fill colors of shapes of a style vector artwork that overlap the shape when the style vector artwork is overlaid on the content vector artwork. The averaging can be a weighted average with weights selected in proportion to the amount of area of the overlap.

The artwork editing system includes a user interface that allows a user to select vector style properties to transfer from one vector artwork to another vector artwork, including fill content, stroke color, stroke width, stroke dashing, and the like, and a percentage of the vector style property that is transferred. Accordingly, the artwork editing system allows a designer to transfer vector style properties of the designer's selection from one vector artwork to another vector artwork efficiently and predictably, in real-time (e.g., without perceptible delay to the designer), and without undesired distortions that are commonly introduced by neural networks. Moreover, the artwork editing system does not require costly training of a neural network.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 illustrates example components of a property map in accordance with one or more aspects of the disclosure.

DETAILED DESCRIPTION

Overview

Figure 1:
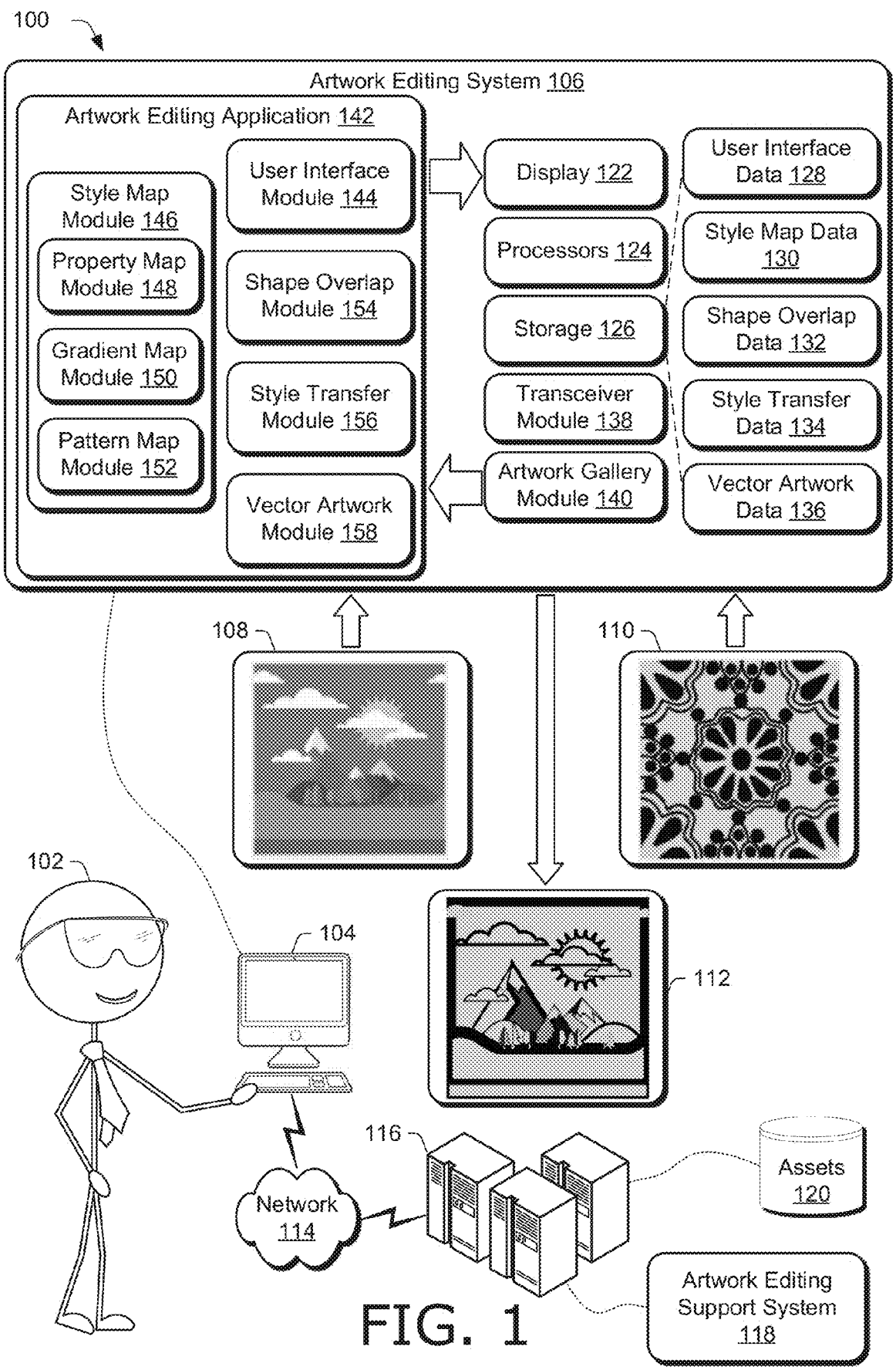
FIG. 1 illustrates a digital medium environment in an example implementation that is operable to employ techniques described herein.

Conventional image editing applications that process vector artworks do not transfer the style of one vector artwork to the content of another vector artwork, and image editing applications that process images represented by raster graphics are not suitable to transfer the style of one vector artwork to the content of another vector artwork. For instance, these image editing applications usually include deep learning models (e.g., neural networks) that are impractical to train on vector artworks, and instead are trained on raster images. Consequently, these deep learning models do not perform well when provided vector artworks, and introduce unacceptable distortions and unpredictable style transfer when transferring style from one image to another image. Moreover, these deep learning models consume significant processor resources that result in implementations having perceptible delay to a user, causing user frustration and inefficient workflows.

Accordingly, this disclosure describes systems, devices, and techniques for transferring vector style properties to a vector artwork efficiently, predictably, and quickly, e.g., in real-time without perceptible delay to a user. An artwork editing system directly processes artworks represented by vector graphics to transfer vector style properties from one vector artwork to another vector artwork, rather than rely on neural networks that are costly to train and process images represented by raster graphics.

To transfer the style from a style vector artwork to content of a content vector artwork and generate a stylized vector artwork having shapes of the content vector artwork in a style determined from shapes of the style vector artwork, the artwork editing system generates respective style maps for the content vector artwork and the style vector artwork. A style map includes shape designators and vector style properties for shapes designated by the shape designators for cells (e.g., pixels) of an image representing the vector artwork. Vector style properties for a shape can include a fill color, a fill opacity, a fill pattern, a stroke width, a stroke color, a stroke opacity, a stroke dashing, gradient parameters, properties for a shadow, and the like. In one example, the artwork editing system generates a style map by flattening curves of shapes into line segments, and traversing the vector artwork with scanlines to determine points on a grid belonging to shapes of the vector artwork based on positions of the points on the scanline relative to the line segments. For each point on the grid, the style map includes a shape designator and vector style properties that are determined from the vector artwork.

In one example, the artwork editing system generates a style map to represent shape designators and vector style properties, the style map including a property map, a gradient map, and a pattern map. The property map includes shape designators and visual properties for shapes designated by the shape designators, such as a fill color and stroke properties. The gradient map includes gradient properties for shapes having a gradient applied to their content, such as parameters of an equation representing a gradient (e.g., points defining a slope and parameters defining color transitions) and the shape designator for which the gradient is applied. The pattern map includes pattern properties for shapes having a pattern (e.g., a fill content corresponding to a pattern), such as a pattern designator or identification number, and the shape designator for which the pattern is used.

Based on the style maps for the content vector artwork and the style vector artwork, the artwork editing system determines vector style properties for shapes of the style vector artwork to transfer to shapes of the content vector artwork. The artwork editing system overlays the style vector artwork on the content vector artwork (e.g., the style vector artwork is virtually mounted on top of the content vector artwork electronically). In one example, overlaying includes resizing at least one of the style vector artwork or the content vector artwork to have a same height, a same width, or a same height and a same width as one another. Using the style maps for the overlaid vector artworks, the artwork editing system determines, for each shape of the content vector artwork, shapes of the style vector artwork that overlap the shape of the content vector artwork, and an amount of area of the shape of the content vector artwork overlapped by the shapes of the style vector artwork. In one example, the artwork editing system stores designators for the shapes of the style vector artwork that overlap the shape of the content vector artwork, and an amount of area of the shape of the content vector artwork overlapped by each of the shapes of the style vector artwork in an overlap map.

The artwork editing system includes a user interface that allows a user to select vector style properties to transfer from one vector artwork to another vector artwork, including fill content, stroke color, stroke width, stroke dashing, shadow properties, reflection properties, glow properties, combinations thereof, and the like. Based on the user selections and the overlap map, the artwork editing system determines vector style properties to transfer to the shape of the content vector artwork. In one example, when the user selections indicate to transfer fill content of the style vector artwork to a shape of the content vector artwork, the artwork editing system determines a fill content as one of a pattern, a gradient, or a solid fill according to a prioritized order based on the area of the shape of the content vector artwork overlapped by shapes of the style vector artwork and the fill content of those shapes. For instance, the artwork editing system can determine a pattern as the fill content when, for shapes of the style vector artwork that overlap the shape of the content vector artwork and that have patterns, their area of overlap is greater than an area threshold, such as seventy percent (70%) of the area of the shape of the content vector artwork. The artwork editing system can determine a gradient as the fill content when a pattern is not determined as the fill content and, of the shapes of the style vector artwork that overlap a shape of the content vector artwork, shapes having gradients occupy more area of the shape than shapes having solid fills. The artwork editing system can determine a solid fill as the fill content when the fill content is not determined as the pattern or the gradient. Accordingly, the artwork editing system determines a fill content according to a prioritized hierarchical order, giving higher priority to patterns than gradients or solid fills, and a higher priority to gradients than solid fills. In one example, this hierarchy can be manually controlled by the user of the artwork editing system.

When the artwork editing system determines a pattern as the fill content for a shape, the artwork editing system determines a pattern content from the shapes of the style vector artwork that overlap the shape of the content vector artwork. In one example, from the shapes of the style vector artwork that overlap a shape of the content vector artwork and have a pattern, the artwork editing system determines pattern content from one of the shapes occupying a largest area of overlap.

When the artwork editing system determines a gradient as the fill content for a shape, the artwork editing system determines parameters of the gradient from shapes of the style vector content that overlap the shape of the content vector artwork and have a gradient. The artwork editing system determines an angle for a gradient vector in the style vector artwork, and maps the angle to points that are used to apply a gradient to the shape from the content vector artwork. When multiple shapes of the style vector artwork have gradients and overlap a shape of the content vector artwork, the artwork editing system determines an angle for the gradient of the shape based on a vector sum of the gradients for the multiple shapes.

When the artwork editing system determines a solid fill as the fill content for a shape, the artwork editing system determines a fill content (e.g., fill color, fill opacity, or both fill color and fill opacity) from the fill content of the shapes of the style vector artwork that overlap the shape of the content vector artwork. For instance, the artwork editing system can determine a fill color for a shape of a content vector artwork by combining the fill colors of shapes of a style vector artwork that overlap the shape of the content vector artwork. The artwork editing system can determine the shapes of the style vector artwork that overlap a shape of the content vector artwork from the overlap map, and determine the fill colors for the shapes of the style vector artwork from the style map for the style vector artwork. The combining of fill colors can be in proportion to the areas of the shape of the content vector artwork overlapped by the shapes of the style vector artwork. For instance, if a first shape of the style vector artwork overlaps thirty percent (30%) of the shape of the content vector artwork and a second shape of the style vector artwork overlaps sixty percent (60%) of the shape of the content vector artwork, the artwork editing system may combine the color of the first shape and the color of the second shape to determine a color for the shape of the content vector artwork, and use twice as much as the color of the second shape than the color of the first shape in the combining.

The artwork editing system can combine fill content of shapes in any suitable way. In one example, the artwork editing system combines fill content by averaging the fill content of shapes of the style vector artwork that overlap a shape of the content vector artwork. Averaging can include an arithmetic mean. Additionally or alternatively, the artwork editing system can combine fill content of shapes based on a median operation of the fill content of shapes. A median operation can include determining a middle value of values of the fill content. Additionally or alternatively, the artwork editing system can combine fill content of shapes based on a mode operation of the fill content of shapes. A mode operation can include determining a most-frequently occurring value of values of the fill content.

In one example, the artwork editing system combines fill content of shapes by applying a whitening and coloring transformation. The artwork editing systems generates, based on the style maps for the content vector artwork and the style vector artwork, a first fill color map for the content vector artwork and a second fill color map for the style vector artwork. For instance, the artwork editing system can generate the fill color maps from the style maps by extracting the fill colors at each point represented by the style maps. The artwork editing system applies a whitening and coloring transformation by applying a whitening transformation to the first color map, and applying a coloring transformation to results of applying the whitening transformation. The whitening transformation whitens the first color map so that the results of applying the whitening transformation have an identity matrix as a covariance matrix. The coloring transformation colors the results of applying the whitening transformation so that the second color map and results of applying the coloring transformation have matching covariance matrices.

The user interface of the artwork editing system can provide options for transferring any suitable vector style property from one vector artwork to another vector artwork. In one example, the user interface of the artwork editing system provides options for transferring vector style properties of strokes of shapes. A stroke of a shape refers to properties of a border or outline of the shape, such as a width of a stroke used to trace or define a shape, a color of a stroke, opacity of a stroke, dashing properties of a stroke, such as a dashing pattern (e.g., an order of dashes, dots, lengths of dashes, such as long and short dashes, spaces between dashes, and the like). Hence, user selections may include to transfer a stroke color, a stroke width, stroke dashing, combinations thereof, and the like.

When the user selections indicate to transfer a stroke color, stroke opacity, or stroke dashing of shapes of the style vector artwork to a shape of the content vector artwork, the artwork editing system determines a stoke color, stroke opacity, or stroke dashing from averages of the stroke colors, stroke opacities, and stroke dashings, respectively, of the shapes of the style vector artwork that overlap the shape of the content vector artwork. The averages may be a weighted average, with weights selected in proportion to the areas for the shapes indicated by the overlap map. Hence, a first shape of the style vector artwork that overlaps more of a shape of the content vector artwork than a second shape of the style vector artwork overlaps the shape may be given a larger weight than the second shape in an average calculation used to determine a stroke color, stroke opacity, or stroke dashing.

When the user selections indicate to transfer a stroke width of shapes of the style vector artwork to a shape of the content vector artwork, the artwork editing systems determines the stroke width for the shape of the content vector artwork according to the stroke widths of shapes of the style vector artwork that overlap the shape of the content vector artwork, normalized by the area of the shape of the content vector artwork. Hence, the stroke width for the shape of the content vector artwork appears natural for the shape when the vector style properties are transferred to the shape in a stylized vector artwork.

Furthermore, the user interface of the artwork editing system includes a user selection to set a transfer percentage for a vector style property that is transferred from a style vector artwork to a shape of a content vector artwork. For instance, a user may set a transfer percentage via a slider option in a user interface, and the artwork editing system interpolates between an original vector style property for the shape (e.g., as determined by the content vector artwork) and a vector style property determined by the artwork editing system (e.g., from shapes of the style vector artwork that overlap the shape of the content vector artwork). Hence, when a shape is originally colored blue by the content vector artwork, and the artwork editing system determines red as a fill color for the shape based on shapes from a style vector artwork that overlap the shape of the content vector artwork, a user may select how much red is transferred to the shape and how much blue is retained for the shape in a stylized vector artwork by adjusting the transfer percentage.

Accordingly, the artwork editing system allows a designer to transfer vector style properties of the designer's selection from one vector artwork to another vector artwork efficiently and predictably, in real-time (e.g., without perceptible delay to the designer), and based on a transfer amount set by the designer. Vector style properties not selected by the designer for transfer are retained from the original vector artwork in the stylized vector artwork. Furthermore, since the artwork editing system transfers vector style properties without a neural network, costly training of the neural network is not required, and undesired distortions that are commonly introduced by neural networks are avoided. Moreover, since the artwork editing system works directly on images represented by vector graphics, rather than raster graphics, the artwork editing system preserves the scaling invariance associated with vector graphics and generates images compatible with image editing applications that process vector artworks.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device. In the example in FIG. 1, user 102 is illustrated as having computing device 104, which may include one or more computing devices. For instance, computing device 104 may include one or more of a mobile phone, tablet, laptop computer, desktop computer, gaming device, goggles, glasses, camera, digital assistant, echo device, image editor, non-linear editor, digital audio workstation, copier, scanner, and the like. Moreover, computing device 104 may include a computing device ranging from a full resource device with substantial memory and processor resources (e.g., personal computers, game consoles) to a low-resource device with limited memory or processing resources (e.g., mobile devices).

In one example, computing device 104 includes a wearable device that is designed to be worn by, attached to, carried by, or otherwise transported by user 102. Examples of wearable devices include glasses, a smart band or watch, and a pod device such as clip-on fitness device, media player, or tracker. Other examples of a wearable device include but are not limited to a badge, a key fob, an access card, and a ring, an article of clothing, a glove, and a bracelet.

Various types of input devices and input instrumentalities can be used to provide input to computing device 104. For example, computing device 104 can recognize input as being a mouse input, stylus input, touch input, input provided through a natural user interface, and the like. Thus, computing device 104 can recognize multiple types of gestures including touch gestures and gestures provided through a natural user interface. In one example, computing device 104 includes speech recognition, identification, and synthesis functionalities, microphones, and speakers that allow computing device 104 to communicate with user 102 in a conversation, e.g., a user conversation.

Figure 13:
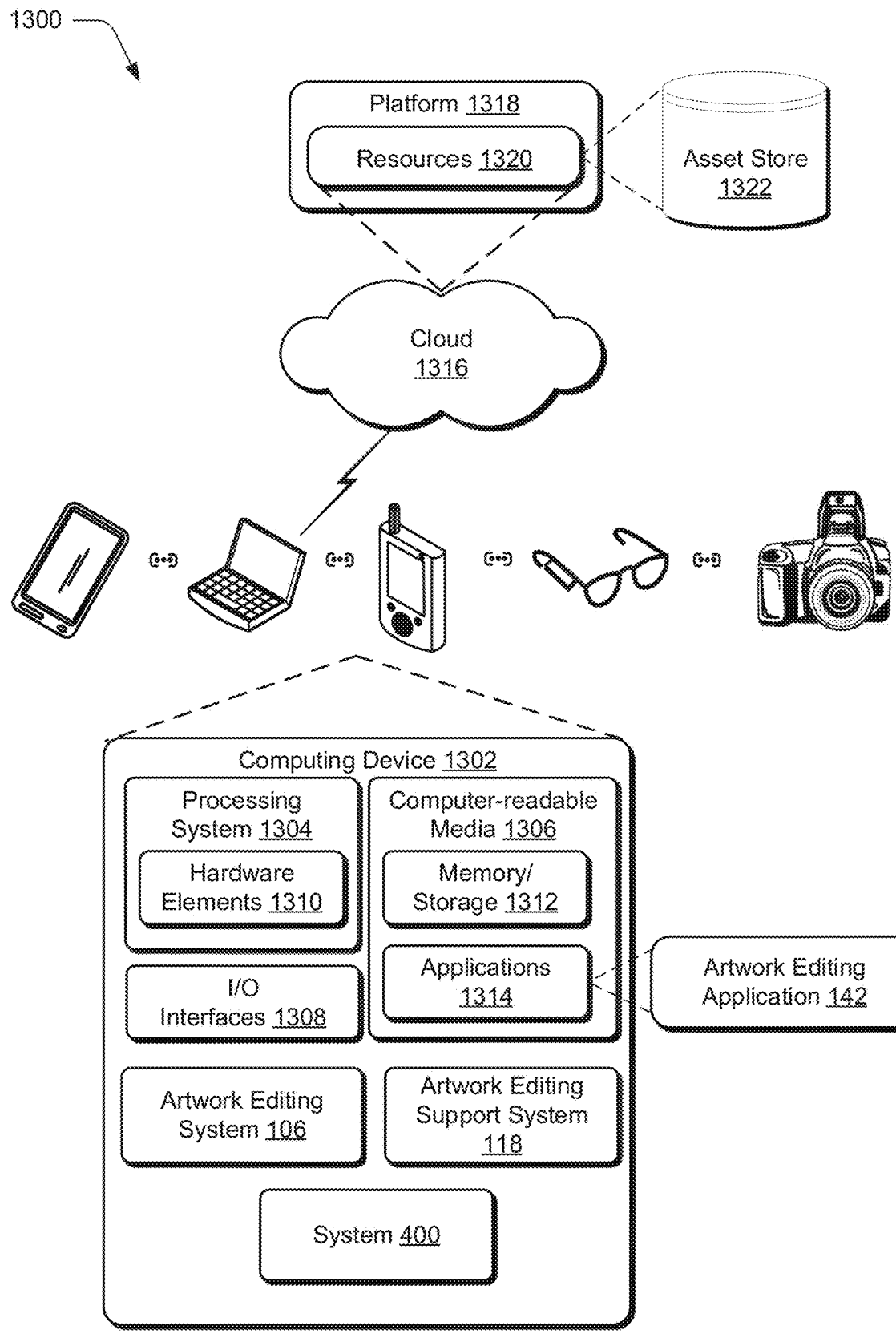
FIG. 13 illustrates an example system including various components of an example device that can be implemented as any type of computing device as described and/or utilized with reference to FIGS. 1-12 to implement aspects of the techniques described herein.

Furthermore, computing device 104 may be representative of one or a plurality of different devices, such as one or more devices connected to a network that perform operations "over the cloud" as further described in relation to FIG. 13. In one example, computing device 104 includes computing devices that are communicatively coupled to each other, such as with a low power wireless communication standard (e.g., a Bluetooth® protocol). Hence, an asset (e.g., image, video, text, drawing, document, file, and the like) generated, processed, edited, or stored on one device of computing device 104 can be communicated to, and displayed and processed on another device of computing device 104.

Computing device 104 includes artwork editing system 106 (discussed below in more detail) for transferring vector style properties to a vector artwork. In the example digital medium environment 100, artwork editing system 106 obtains content vector artwork 108 and style vector artwork 110. Artwork editing system 106 can obtain the content vector artwork 108 and the style vector artwork 110 in any suitable way. In one example, the content vector artwork 108 and the style vector artwork 110 are user-provided. For instance, user 102 may provide the content vector artwork 108 and the style vector artwork 110 as inputs to the artwork editing system 106. Additionally or alternatively, user 102 may provide the content vector artwork 108 and the style vector artwork 110 to artwork editing system 106 via a user interface exposed by artwork editing system 106. In one example, artwork editing system 106 obtains the content vector artwork 108 and the style vector artwork 110 by receiving the content vector artwork 108 and the style vector artwork 110, such as from a server as part of a dataset of images stored in a database at the server.

In the example illustrated in FIG. 1, artwork editing system 106 transfers vector style properties from shapes of the style vector artwork 110 to shapes of the content vector artwork 108, and generates stylized vector artwork 112. For instance, the content vector artwork 108 depicts a landscape scene, and the style vector artwork 110 includes a graphic in a floral-like style. Accordingly, artwork editing system 106 generates stylized vector artwork 112 which depicts the landscape scene of the content vector artwork 108 in the floral style of the style vector artwork 110. For instance, the stylized vector artwork 112 includes the shapes of the content vector artwork 108 having colors and strokes determined from the colors and strokes, respectively, of shapes of the style vector artwork 110.

Computing device 104 is also coupled to network 114. Network 114 communicatively couples computing device 104 with server 116. Network 114 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 116 may include one or more servers or service providers that provide services and/or resources to computing device 104. Generally, resources provided by server 116 may be licensed, purchased, or may be made freely available, (e.g., without authentication, license, or account-based access). The resources can include any suitable combination of services and content, such as made available over network 114 by one or more providers. Some examples of services include, but are not limited to, an on-line shopping service, an image editing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, vector artworks, and the like. Assets may be made available to artwork editing system 106, artwork editing support system 118, or combinations thereof, and stored at assets 120 of server 116. Hence, content vector artwork 108 and style vector artwork 110 may be stored at assets 120 of server 116 and provided to computing device 104 via network 114.

Furthermore, server 116 includes artwork editing support system 118 configurable to receive signals from computing device 104, process the received signals, and send the processed signals to computing device 104 to support transferring vector style properties to a vector artwork. For instance, computing device 104 may obtain the content vector artwork 108 and the style vector artwork 110 and generate respective style maps with artwork editing system 106. Computing device 104 may then communicate the style maps to server 116 via network 114. Server 116, using artwork editing support system 118, may generate a stylized shapes map from the style maps received from the computing device 104. Server 116 may then provide the stylized shapes map to computing device 104, which can generate the stylized vector artwork 112 based on the stylized shapes map and the content vector artwork 108. Accordingly, artwork editing support system 118 of server 116 can include an instantiation of artwork editing system 106.

Computing device 104 includes artwork editing system 106 to transfer vector style properties to a vector artwork (e.g., from one vector artwork to another vector artwork). Artwork editing system 106 includes a display 122, which can expose any suitable data used by or associated with artwork editing system 106. In one example, display 122 displays a user interface for exposing assets, such as digital images, content vector artworks, style vector artworks, stylized vector artworks, output images, results of whitening and coloring transforms, representations of style maps, color maps, property maps, gradient maps, pattern maps, overlap maps, styled shapes maps, combinations thereof, and the like. Display 122 can expose a user interface configurable to edit an image, such as a content vector artwork or a style vector artwork, and a "transfer image style" button to enable artwork editing system 106 to transfer vector style properties of shapes of the style vector artwork to a shape of the content vector artwork.

Display 122 can include any suitable type of display, such as a touchscreen, liquid crystal display, plasma display, head-mounted display, projector and screen, and the like. A touchscreen of display 122 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Artwork editing system 106 also includes processors 124. Processors 124 can include any suitable type of processor, such as a graphics processing unit, central processing unit, digital signal processor, processor core, combinations thereof, and the like. Hence, artwork editing system 106 may be implemented at least partially by executing instructions stored on storage 126 on processors 124. For instance, processors 124 may execute portions of artwork editing application 142 (discussed below in more detail).

Storage 126 can be any suitable type of storage accessible by or contained in artwork editing system 106. Storage 126 stores and provides access to and from memory included in storage 126 for any suitable type of data. For instance, storage 126 includes user interface data 128, including data associated with user interfaces, such as user preferences (e.g., font size and style, locations and sizes of panels presented in a user interface, or preferred by users, and the like), data of users operating a user interface (e.g., user histories of edits including user-selections of style images, user interface configurations (e.g., different layouts, language options, etc.), controls and adjusters (e.g., sliders, lists of user gestures to control a user interface, etc.), transfer percentages, user interface version numbers, lists of operating systems supported by various user interfaces, thumbnail representations of images and artworks to display in a user interface, toolbar icons, speech libraries for voice-actuated commands and gestures, vector artworks exposed in a user interface, such as content vector artwork, style vector artwork, stylized vector artwork, and the like.

Storage 126 also includes style map data 130, including data associated with style maps, such as content vector artworks, style vector artworks, property maps, gradient maps, pattern maps, shape identification maps, sizes (e.g., height and width) of vector artworks, line segments resulting from flattened curves of vector artworks, numbers of line segments making up a shape, positions (e.g., coordinates in a grid) of end points of line segments, vector style properties, number of scanlines, and the like.

Storage 126 also includes shape overlap data 132, including data associated with overlaying a style vector artwork and content vector artwork, such as overlap maps, designators of shapes of a style vector artwork that overlap shapes of a content vector artwork, amounts of area of overlap of shapes (e.g., numbers of pixels), vector style properties of shapes of a style vector artwork that overlap shapes of a content vector artwork, sizes (e.g., height and width) of vector artworks, and the like.

Storage 126 also includes style transfer data 134, including data associated with transferring vector style properties from one vector artwork to another vector artwork, such as style selections (e.g., user selections indicating vector style properties to transfer, function selections, such as mean, median, or mode designators, etc.), overlap maps, style maps, styled shapes maps, transfer attributes determined from style maps, transfer functions used to generate styled shapes maps, and the like.

Storage 126 also includes vector artwork data 134, including data associated with vector artwork that includes transferred vector style properties, such as styled shapes maps, content vector artwork, combining parameters (e.g., user-selected transfer percentages for different vector style properties), stylized vector artworks that include shapes of a content vector artwork having vector style properties determined from shapes of a style vector artwork, and the like.

Furthermore, artwork editing system 106 includes transceiver module 138. Transceiver module 138 is representative of functionality configured to transmit and receive data using any suitable type and number of communication protocols. For instance, data within artwork editing system 106 may be transmitted to server 116 with transceiver module 138. Furthermore, data can be received from server 116 with transceiver module 138. Transceiver module 138 can also transmit and receive data between devices included in computing device 104. In one example, transceiver module 138 includes a low power wireless communication standard (e.g., a Bluetooth® protocol) for communicating data between devices of computing device 104.

Artwork editing system 106 also includes artwork gallery module 140. Artwork gallery module 140 is representative of functionality configured to obtain and manage vector artworks of artwork editing system 106, such as vector artworks that can be edited (e.g., by transferring vector style properties from one vector artwork to another vector artwork), content vector artworks, style vector artworks, vector artworks in an animation sequence, and the like. Hence, artwork gallery module 140 may use transceiver module 138 to obtain any suitable data from any suitable source, including obtaining vector artworks from a user's directory of files on computing device 104 or server 116, obtaining vector artworks from a user's photo gallery (e.g., an online photo sharing service, images stored in a user's image editing application), obtaining vector artworks a user has posted in a social media post, blog, online comment, and the like, vector artworks a user has attached to an email, text, or other communication sent from or received by computing device 104, vector artworks provided by a search service, such as an online search for images related to a search query, vector artworks obtained from a database of stock vector artworks, vector artworks provided by user 102 (e.g., receiving user-supplied vector artworks), vector artworks from web pages visited by a user operating computing device 104, and the like. Vector artworks obtained by artwork gallery module 140 are stored in storage 126 and made available to modules of artwork editing application 142.

Artwork editing system 106 also includes artwork editing application 142. Artwork editing application 142 includes user interface module 144, style map module 146 which includes property map module 148, gradient map module 150, and pattern map module 152, shape overlap module 154, style transfer module 156, and vector artwork module 158. These modules work in conjunction with each other to transfer vector style properties to a vector artwork (e.g., from one vector artwork to another vector artwork) quickly and efficiently, e.g., in real-time with no perceptible delay to a user.

Furthermore, though the description of artwork editing system 106 and artwork editing application 142 describes transferring vector style properties from one vector artwork to another vector artwork, artwork editing system 106 and artwork editing application 142 can be used to transfer any suitable property of any suitable asset, such as text properties from one document to another document, style properties from one shape to a semantically similar shape (e.g., from an ellipse to a circle), etc.

User interface module 144 is representative of functionality configured to generate, manage, and cause display of any suitable user interface, such as a user interface including a representation of a vector artwork. A user interface of user interface module 144 can expose any suitable data, such as a content vector artwork, a style vector artwork, a stylized vector artwork having shapes of the content vector artwork with vector style properties determined from shapes of the style vector artwork, an animation sequence of vector artworks, representations of property maps, style maps, overlap maps, styled shapes maps, thumbnail representations of artworks, combinations thereof, and the like.

A user interface of user interface module 144 can expose any suitable control options, such as options for selecting vector artworks, including lists of vector artworks and thumbnail representations of vector artworks, options for selecting any suitable threshold used by artwork editing system 106 (e.g., an area threshold), options for selecting transfer percentages, options for selecting vector style properties to transfer from one vector artwork to another vector artwork (e.g., fill content, stroke color, stroke width, stroke dashing, etc.), options for selecting a type of function used to determine a color, such as mean, median, mode, or whitening and coloring, and the like. In one example, a user adjusts a slider control exposed in a user interface of user interface module 144 to select a transfer percentage that denotes an amount of a vector style property determined from shapes of a style vector artwork that is transferred to a shape of a content vector artwork in a stylized vector artwork.

In one example, a user interface of user interface module 144 exposes thumbnail representations of vector artworks, such as vector artworks retrieved from artwork gallery module 140. A user can select a thumbnail representation of a vector artwork and cause vector style properties of the selected vector artworks to be transferred to shapes of a content vector artwork. Additionally or alternatively, a user can select a thumbnail representation of a vector artwork and cause a shape of the selected vector artwork to be updated by transferring vector style properties of a style vector artwork to the shape of the selected vector artwork. For instance, when a user select a thumbnail representation of a content vector artwork, a stylized vector artwork may be generated that includes shapes of the content vector artwork with vector style properties determined from a style vector artwork exposed in the user interface.

A user interface generated by user interface module 144, along with any suitable information, such as configurations settings of the user interface, user gestures (e.g., user inputs), thumbnail representations, user preferences, user selections, vector artworks exposed in a user interface, combinations thereof, and the like, used by or calculated by user interface module 144 are stored in user interface data 128 of storage 126 and made available to modules of artwork editing application 142. In one example, a user interface generated by user interface module 144 is displayed by display 122, and the user interface exposes a content vector artwork, a style vector artwork, and a stylized vector artwork generated by transferring vector style properties of shapes of the style image to one or more shapes of the content vector artwork.

Style map module 146 is representative of functionality configured to generate style maps for vector artworks. Style map module 146 can generate any suitable style map, such as a style map that includes shape designators and vector style properties for shapes in a vector artwork designated by the shape designators. In one example, style map module 146 generates a first style map for a content vector artwork and a second style map for a style vector artwork.

To represent shape designators and vector style properties for shapes designated by the shape designators, style map module 146 can generate a style map that includes a property map, a gradient map, and a pattern map. Accordingly, style map module 146 includes property map module 148, gradient map module 150, and pattern map module 152, which generate property maps, gradient maps, and pattern maps, respectively.

Property map module 148 is representative of functionality configured to generate property maps for vector artworks. A property map includes a two-dimensional (2D) matrix which includes a list of properties at each point on a grid in a coordinate plane that spans a vector artwork (e.g., at each pixel of a rendered vector artwork). The list of properties at each point of a property map can include any suitable property regarding a shape of the vector artwork at the point. In one example, property map module 148 generates a property map that includes, for each point on a grid, the properties denoted in Table 1.

TABLE 1

Example Properties of a Property Map

Shape Designator (e.g., identification number)
Fill Color - RGBA
Stroke Color - RGBA
Stroke Width
Stroke Dashing In one example, a color includes an opacity indicator, so that Fill Color—RGBA includes both a color and opacity of the fill content, and Stroke Color—RGBA includes both a color and opacity of the stroke.

Property map module 148 can generate a property map in any suitable way. In one example, property map module 148 generates a property map by flattening curves of shapes into line segments, and traversing the vector artwork with a scanline to determine points on a grid (e.g., pixels) belonging to shapes of the vector artwork based on positions of the points on the scanline relative to the line segments. For each point on the grid, the style map includes a shape designator and vector style properties that are determined from the vector artwork. These operations are described in more detail with respect to FIG. 2.

FIG. 2 illustrates example components of a property map in accordance with one or more aspects of the disclosure generally at 200. FIG. 2 includes image 202 and shape identification map 204. Image 202 illustrates how property map module 148 determines points on a grid that belong to shapes of a vector artwork. Image 202 includes a shape 206 of a vector artwork that has been flattened. For instance, property map module 148 flattens the Bezier curves of shapes into line segments, so that shape 206 is denoted as a polygon with line segments connecting points A, B, C, D, E, and F. To flatten the Bezier curves of shapes, property map module 148 performs a divide—and conquer algorithm (e.g., De Caseljau's algorithm) in which a curve's curvature is compared to a curvature threshold. If the curve's curvature is below the curvature threshold, the curve is replaced by a line segment having the same start and stop points as the curve. Otherwise, if the curve's curvature is not below the curvature threshold, the curve is split into two curves (e.g., equal length curves), and the algorithm is repeated until all curves of a shape are represented by line segments. Curvature can be measured in any suitable way, such as based on a normal to a curve, a radius of a circle fit to a curve, a derivative of a curve, combinations thereof, and the like.

To determine points on a grid that belong to a shape of a vector artwork, property map module 148 traverses the vector artwork with a scanline in a dimension of the vector artwork. For instance, in image 202, a horizontal scanline is traversed vertically across the vector artwork. For each scanline, property map module 148 determines points of the grid (specified by (i,j) pairs) on the scanline that belong to shape 206 based on positions of the points on the scanline relative to the line segments that define the edges of the shape 206. For instance, if a point on a scanline is between edges of the shape 206 and not exterior to the shape 206, then property map module 148 determines the point to belong to shape 206 and writes a shape designator for the shape 206 at the i,jth location of the property map. Accordingly, for scanline 208 in image 202, property map module 148 determines that points 210 on scanline 208 belong to shape 206, and points 212 on scanline 208 do not belong to the shape 206. By traversing the scanline across the vector artwork (e.g., vertically through the vector artwork), property map module 148 assigns a shape designator to each point on the grid of the vector artwork. In one example, each point of the grid corresponds to a pixel location of the rendered vector artwork.

Shape identification map 204 illustrates an example map of shape designators generated by property map module 148. Shape identification map 204 includes a shape designator at each point of a grid of an example vector artwork that includes a circle 214 overlaid on a rectangle 216. Shape identification map 204 assigns points in the background a shape designator of zero, points lying inside the rectangle 216 a shape designator of one, and points lying inside the circle a shape designator of two. For points of overlapping shapes, shape identification map 204 assigns a shape designator to the points based on the z-order of the shapes. Hence, since the circle 214 is on top of the rectangle 216, points in the overlapping area of the circle 214 and the rectangle 216 are assigned the shape designator for the circle 214, or a value of two.

Property map module 148 assigns vector style properties for each of the points in the property map. Hence, for each point having a shape designator in the shape identification map 204, property map module 148 records values for the properties listed in Table 1. Accordingly, property map module 148 records a vector of data for each point of the shape identification map 204. In one example, property map module 148 determines a fill color (e.g., fill color—RGBA in Table 1) from each point (e.g., for each pixel) of the vector artwork, such as from each pixel of a rasterized version of the vector artwork. Additionally or alternatively, property map module 148 determines vector style properties (e.g., properties in Table 1, such as a fill color and stroke color), from shape properties designated by the vector artwork, such as shape properties listed in a data file representing the vector artwork. Hence, property map module 148 may parse a content vector artwork and a style vector artwork and generate a property map for each of the vector artworks.

Returning to FIG. 1, style map module 146 also includes gradient map module 150. Gradient map module 150 is representative of functionality configured to generate gradient maps for vector artworks. A gradient refers to a change in a parameter (e.g., color) over a shape, and gradient map module 150 generates a gradient map that includes shape designators and gradient parameters that define the gradient for each shape that includes a gradient. In one example, gradient map module 150 generates a gradient map G of the form $$G=\{\text{Shape designator: Gradient parameters}\}.$$

Gradient parameters of a gradient map can include any suitable parameters that define how a gradient is applied to the fill content (e.g., a color) of a shape of a vector artwork. In one example, gradient parameters include coordinates of endpoints that define a slope along which a linear gradient is applied. Additionally or alternatively, a gradient map can include stop-points and offsets, which define where transitions (e.g., color transitions) take place. For instance, each stop-point can denote the end of one color and the start of another color in a gradient of colors along a line determined from the slope of the gradient.

In one example, gradient map module 150 generates a gradient map that includes shape designators for only those shapes that include a gradient. For instance, if a shape does not have a gradient applied to it as designated by the vector artwork, then gradient map module 150 does not list a shape designator for that shape in the gradient map. Additionally or alternatively, gradient map module 150 can generate a gradient map that includes shape designators for all shapes of a vector artwork, and populate the gradient parameters with a null value (e.g., zero, 99, or n/a) to indicate that a shape does not have a gradient applied to it.

Style map module 146 also includes pattern map module 152. Pattern map module 152 is representative of functionality configured to generate pattern maps for vector artworks. A pattern refers to fill content of a shape in a pattern, such as a cross hatch, vertical, horizontal, or diagonal lines, etc. Pattern map module 152 generates a pattern map that includes shape designators and a pattern identification (e.g., pattern ID) that defines the pattern for the shape. In one example, pattern map module 152 generates a pattern map P for a vector artwork of the form $$P=\{\text{Shape designator: Pattern } ID\}.$$

A pattern can be generated based on the pattern ID. For instance, artwork editing system 106 may store a table of generation algorithms for different patterns that can be indexed by a pattern ID, so that content of a shape may be filled with a pattern generated from the table according to the pattern ID.

In one example, pattern map module 152 generates a pattern map that includes shape designators for only those shapes that include a pattern for fill content. For instance, if a shape does not have a pattern as fill content as designated by the vector artwork, then pattern map module 152 does not list a shape designator for that shape in the pattern map. Additionally or alternatively, pattern map module 152 can generate a pattern map that includes shape designators for all shapes of a vector artwork, and populate the pattern ID with a null value (e.g., −1 or n/a) to indicate that a shape does not have a pattern as fill content.

Style map module 146 combines a property map generated by property map module 148, a gradient map generated by gradient map module 150, and a pattern map generated by pattern map module 152 into a style map. Style map module 146 can combine a property map, a gradient map, and a pattern map in any suitable way. In one example, style map module 146 concatenates a property map, a gradient map, and a pattern map to form a style map. A style map S generated by style map module 146 can therefore be expressed as $$S=\{\text{property } map, \text{gradient } map, \text{pattern } map\}.$$

Style maps generated by style map module 146, along with any suitable information, such as property maps, gradient maps, pattern maps, shape identification maps, numbers of points of a grid in each shape of a vector artwork, indications of whether scanlines are horizontal or vertical scanlines, a direction a scanline is traversed (e.g., horizontal or vertical), edge lists including line segments representing edges of shapes after the shapes have been flattened, a curvature threshold, numbers of line segments of a shape, numbers of curves of a shape used to flatten a shape, combinations thereof, and the like, used by or calculated by style map module 146 are stored in style map data 130 of storage 126 and made available to modules of artwork editing application 142. In one example, style map module 146 provides a pair of style maps, one for a content vector artwork and one for a style vector artwork, to shape overlap module 154 and style transfer module 156.

Shape overlap module 154 is representative of functionality configured to generate an overlap map. An overlap map generated by shape overlap module 154 describes shapes of a style vector artwork that overlap shapes of the content vector artwork, and an amount of overlap of the shapes of the content vector artwork for each of the shapes of the style vector artwork.

Shape overlap module 154 can generate an overlap map in any suitable way. In one example, shape overlap module 154 overlaps (e.g., virtually mounts) the style vector artwork on the content vector artwork. For instance, shape overlap module 154 may resize at least one of the style vector artwork or the content vector artwork so that the artworks are a same size (e.g., the style vector artwork and the content vector artwork have a same height, a same width, or a same height and a same width as one another), and electronically place the style vector artwork on the content vector artwork. Using the style maps for the style vector artwork, shape overlap module 154 determines shapes of the style vector artwork that overlap a shape in the content vector artwork, and for each of the shapes of the style vector artwork, an area of the shape in the content vector artwork that is overlapped. Shape overlap module 154 stores this information in an overlap map, O, which can be expressed as $$O=\{C: \{S: \text{Area}(C,S)\}$$

where C denotes a shape designator for a shape in the content vector artwork, S denotes a shape designator for a shape in the style vector artwork that overlaps the shape of the content vector artwork, and Area (C,S) denotes the area of shape C overlapped by shape S. The area can be expressed in any suitable format, such as a number of points or a number of pixels.

Using the overlap map generated by shape overlap module 154 and the style map of the style vector artwork, artwork editing system 106 accumulates visual properties of the shapes of the style vector artwork that overlap shapes of the content vector artwork into a visual properties map Q. The visual properties map Q can include any suitable visual property of a shape. For instance, a visual properties map Q may be expressed as $$Q=\{C: [\text{Fill Color}(S)], [\text{Stroke Color}(S)], [\text{Stroke Width}(S)], [\text{Stroke Dashing}(S)]\}.$$

In this example, the visual properties map Q includes a fill color, a stroke color, a stroke width, and a stroke dashing for shapes S of the style vector artwork that overlap a shape C of the content vector artwork. Color may include an opacity indicator, so that Fill Color(S) includes both a color and opacity of the fill color for shape S, and Stroke Color(S) includes both a color and opacity of the stroke color for shape S. In one example, the visual properties map Q does not indicate an amount of overlap between shapes of the style vector artwork and the content vector artwork. For instance, the visual properties map Q may record a single value of a visual property (e.g., fill color, stroke color, etc.) for each of the shapes S of the style vector artwork that overlap the shape C of the content vector artwork. Hence, functions applied to contents of visual properties map Q, like an average of fill colors over the shapes S of a visual property map, may be an unweighted average that is not influenced by an area of overlap between shapes.

Additionally or alternatively, the visual properties map Q can indicate an amount of overlap of each of the shapes of a style vector artwork S that overlaps the shape of the content vector artwork C. To indicate the amount of overlap, the visual properties map Q can be populated for each point of a shape of a style vector artwork that overlaps the shape of the content vector artwork. For instance, for each point of a shape of a style vector artwork that overlaps the shape of the content vector artwork, the values for fill color, stroke color, etc. can be recorded in the visual properties map Q. Hence, functions applied to contents of visual properties map Q, like an average of fill colors over the shapes S of a visual property map, may be influenced by the number of points of a shape of a style vector artwork that overlaps the shape of the content vector artwork.

Artwork editing system 106 can generate a visual properties map Q in any suitable way. In one example, the visual properties map Q is generated by modifying values of a style map for a vector style artwork. For instance, a style map may be copied and its values modified, such as by overwriting values, deleting values, etc., to generate a visual properties map Q.

Furthermore, visual properties map Q can be generated by any suitable module of artwork editing system 106. In one example, shape overlap module 154 generates visual properties map Q. Additionally or alternatively, style transfer module 156 can generate visual properties map Q from the style map of the style vector artwork generated by style map module 146 and the overlap map generated by shape overlap module 154.

Using the overlap map 0 and the visual properties map Q, artwork editing system 106 determines vector style attributes to transfer to shapes of the content vector artwork. For instance, artwork editing system 106 can transfer a mixture of vector style properties of shapes from a style vector artwork to a shape of a content vector artwork, and the amount of the vector style properties of the shapes in the mixture can be in proportion to the amount of area of the shape of the content vector artwork overlapped by the shapes of the style vector artwork. This idea is illustrate in more detail for a fill color vector style property in FIG. 3.

Figure 3:
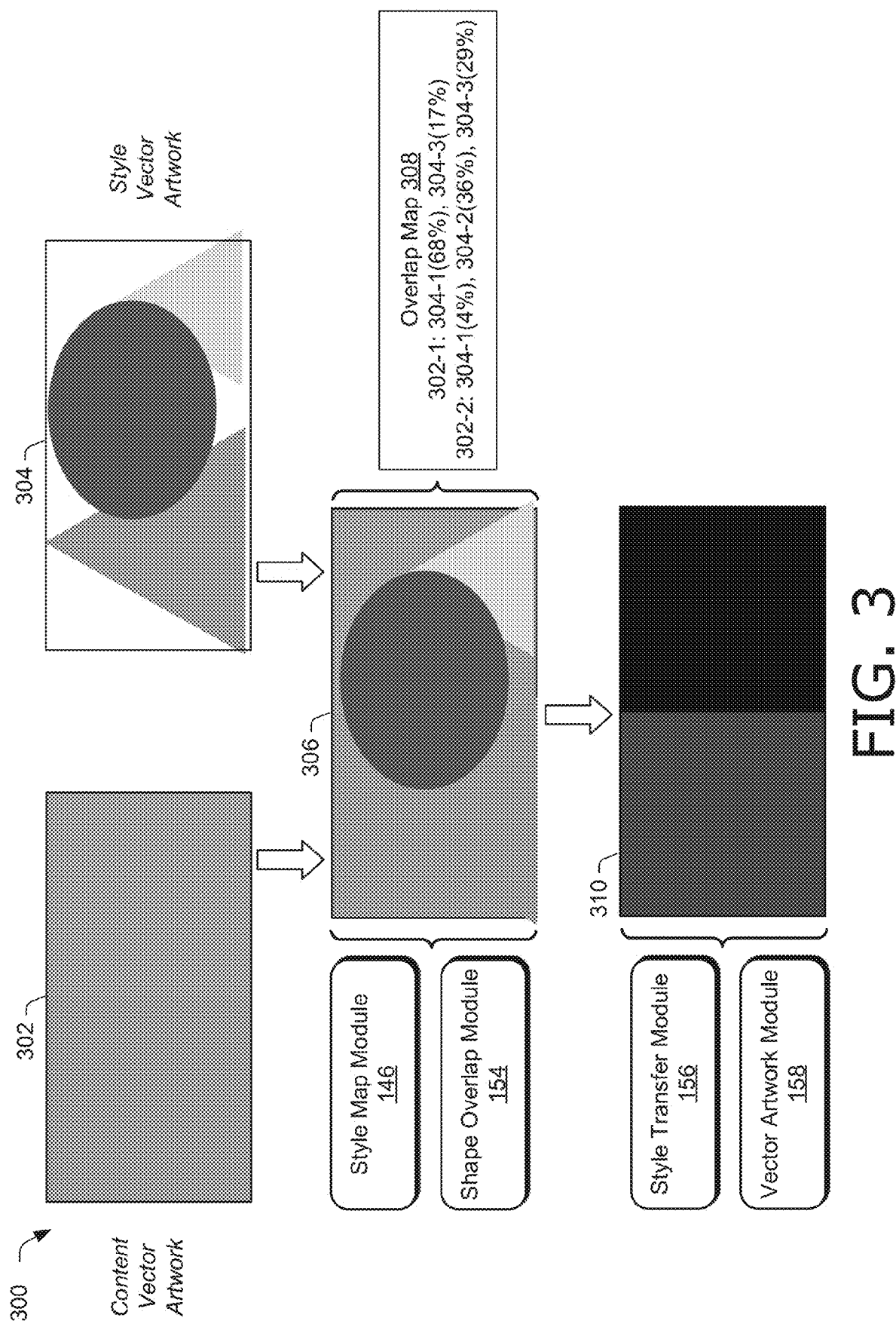
FIG. 3 illustrates example vector artworks in accordance with one or more aspects of the disclosure.

FIG. 3 illustrates example vector artworks 300 in accordance with one or more aspects of the disclosure. Vector artworks 300 includes content vector artwork 302 and style vector artwork 304. Content vector artwork 302 includes two shapes, a left rectangle colored orange and a right rectangle colored pink. Style vector artwork 304 includes three shapes, a left triangle colored green, a right triangle colored yellow, and an ellipse colored blue. Artwork 306 illustrates style vector artwork 304 overlaid on content vector artwork 302. Based on the overlaying of artworks in artwork 306, shape overlap module 154 generates overlap map 308 from style maps for content vector artwork 302 and style vector artwork 304 generated by style map module 146.

Overlap map 308 includes shape designators for shapes of content vector artwork 302. Overlap map 308 can include any suitable shape designators, such as sequential shape designators (e.g., 1, 2, 3, etc.). In the example in FIG. 3, the left rectangle colored orange of content vector artwork 302 is assigned the shape designator 302-1, and the right rectangle colored pink of content vector artwork 302 is assigned the shaped designator 302-2 in overlap map 308. The overlap map 308 also includes shape designators for shapes of the style vector artwork 304 that overlap shapes of the content vector artwork 302, and an amount of the overlap. For instance, the left triangle colored green of the style vector artwork 304 is assigned the shape designator 304-1, the right triangle colored yellow of the style vector artwork 304 is assigned the shape designator 304-2, and the ellipse colored blue of the style vector artwork 304 is assigned the shape designator 304-3.

The overlap map 308 indicates that the rectangle colored orange indicated by the shape designator 302-1 is overlapped by (i) the triangle colored green indicated by shape designator 304-1 by sixty-eight percent (68%) (e.g., 68% of the area of the rectangle colored orange is overlapped by the triangle colored green), and (ii) the ellipse colored blue indicated by shape designator 304-3 by seventeen percent (17%). The overlap map 308 also indicates that the rectangle colored pink indicated by the shape designator 302-2 is overlapped by (i) the triangle colored green indicated by shape designator 304-1 by four percent (4%), (ii) the triangle colored yellow indicated by shape designator 304-2 by thirty-six percent (36%), and (iii) the ellipse colored blue indicated by shape designator 304-3 by twenty-nine percent (29%).

Stylized vector artwork 310 includes the shapes of content vector artwork 302 (e.g., the two rectangles) with fill colors determined from the fill colors of the shapes of the style vector artwork 304. Style transfer module 156 determines mixtures of fill colors for the shapes of the content vector artwork 302, and vector artwork module 158 generates the stylized vector artwork 310 having the shapes of the content vector artwork 302 with fill colors based on the mixtures determined by style transfer module 156. For instance, the left rectangle of stylized vector artwork 310 is colored dark green, which is a mixture of the fill colors green and blue of the triangle indicated by shape designator 304-1 and the ellipse indicated by shape designator 304-3, respectively. In one example, the mixtures of green and blue are in proportion to the area of the left rectangle indicated by shape designator 302-1 overlapped by the triangle indicated by shape designator 304-1 and the ellipse indicated by shape designator 304-3. For instance, the mixture of green and blue may be determined from 0.68×Green+0.17×Blue. Additionally or alternatively, the mixture may be based on a color of the left rectangle in the content vector artwork 302. For instance, the color of dark green for the left rectangle in stylized vector artwork 310 may be based on a mixture of α×Orange+0.68×Green+0.17×Blue for combining weight α, since the left rectangle of content vector artwork 302 is colored orange. In one example, the combining weight α is selected based on the area of the left rectangle of the content vector artwork 302 that is not overlapped by shapes of the style vector artwork 304.

The right rectangle of stylized vector artwork 310 is colored dark purple, which is a mixture of the fill colors green, yellow, and blue of the triangle indicated by shape designator 304-1, the triangle indicated by the shape designator 304-2, and the ellipse indicated by shape designator 304-3, respectively. In one example, the mixtures of green, yellow, and blue are in proportion to the area of the right rectangle overlapped by the shapes of the style vector artwork. For instance, the mixture of green, yellow, and blue may be determined from 0.04×Green+0.36×Yellow+0.29× Blue. Additionally or alternatively, the mixture may be based on a color of the right rectangle in the content vector artwork 302. For instance, the color of dark purple for the right rectangle in stylized vector artwork 310 may be based on a mixture of α×Pink+0.04×Green+0.36×Yellow+0.29× Blue for combining weight α, since the right rectangle of content vector artwork 302 is colored pink. In one example, the combining weight α is selected based on the area of the right triangle of the content vector artwork 302 that is not overlapped by shapes of the style vector artwork 304.

Returning again to FIG. 1, overlap maps generated by shape overlap module 154, along with any suitable information, such as sizes (e.g., height and width) of vector artworks that are overlaid, shapes of the style vector artwork that overlap a shape in the content vector artwork, amounts of overlap for each of the shapes of the style vector artwork that overlap the shape in the content vector artwork, visual properties maps, combinations thereof, and the like, used by or calculated by shape overlap module 154 are stored in shape overlap data 132 of storage 126 and made available to modules of artwork editing application 142. In one example, shape overlap module 154 provides an overlap map to style transfer module 156.

Style transfer module 156 is representative of functionality configured to generate a styled shapes map that includes vector style properties that can be transferred to shapes of a content vector artwork. In one example, style transfer module 156 receives an overlap map from shape overlap module 154 and style selections from user interface module 144 (e.g., user selections designating vector style properties to transfer, such as fill content and stroke width), and implements a transfer function to generate a styled shapes map can be used by vector artwork module 156 to generate a stylized vector artwork that includes shapes of a content vector artwork having vector style properties based on a style vector artwork. For instance, style transfer module 156 can generate a styled shapes map $S_{StyledShapes}$ according to $S_{StyledShapes}$={Shape designator: fill color, fill opacity, stroke color, stroke opacity, stroke width, stroke data, gradient parameters, pattern ID}

$=T_X(S_{content}, S_{style}, O, Q, A)$ where $S_{content}$ and $S_{style}$ denote style maps for the content vector artwork and the style vector artwork, respectively, generated by style map module 146, O denotes an overlap map for the content vector artwork and the style vector artwork generated by shape overlap module 154, Q denotes a visual properties map for shapes of the style vector artwork that overlap shapes of the content vector artwork, A denotes transfer style selections, such as user selections designating vector style properties to transfer (e.g., fill content, stroke width, etc.) and function selections, such as a selection of a mean, median, or mode to calculate a color, and $T_X$ denotes a transfer function implemented by style transfer module 156 to generate the styled shapes map $S_{StyledShapes}$.

Accordingly, style transfer module 156 determines vector style properties to transfer to shapes of the content vector artwork based on vector style properties of shapes of a style vector artwork that overlap the shapes of the content vector artwork when the artworks are overlaid (e.g., virtually mounted) on one another. Style transfer module 156 can transfer any suitable vector style properties, such as fill content properties, stroke properties, shadow properties, reflection properties, etc.

Fill Content Properties

When transfer style selections, A, denotes that fill content is to be transferred to a shape of a content vector, style transfer module 156 determines the vector style property of the fill content to transfer based on the fill content of the shapes of the style vector artwork and the area of shapes of the content vector artwork overlapped by the shapes of style vector artwork. Style transfer module 156 determines vector style properties of the fill content to transfer in a hierarchical, prioritized order based on a type of the fill content as one of a pattern, a gradient, or a solid fill.

Style transfer module 156 determines a fill content for a shape of a content vector artwork according to a prioritized hierarchical order that gives higher priority to patterns than gradients or solid fills, and a higher priority to gradients than solid fills. Style transfer module 156 determines a fill content as a pattern when an area of a shape of the content vector artwork overlapped by shapes of a style vector artwork that have patterns is greater than or equal to an area threshold. In one example, the area threshold is set to the maximum (or total) area of the shape of the content vector artwork, so that style transfer module 156 determines a pattern as the fill content for the shape only when the shape is completely covered by shapes of the style vector artwork that have patterns. Additionally or alternatively, the area threshold can be user selectable. For instance, a user may select a percentage of the area of the shape of the content vector artwork that must be covered (e.g., seventy percent) by shapes of the style vector artwork that have patterns to determine the fill content for the shape as a pattern.

When style transfer module 156 determines a fill content for a shape as a pattern, the pattern ID for the shape is determined from a shape of the style vector artwork having a pattern that occupies a largest area of the shape of the content vector artwork. For instance, if eighty-five percent (85%) of a shape of the content vector artwork is overlapped by a first shape of the style vector artwork having a first pattern ID, and sixty-five percent (65%) of the shape of the content vector artwork is overlapped by a second shape of the style vector artwork having a second pattern ID, style transfer module 156 determines the pattern ID for the shape of the content vector artwork as the first pattern ID.

In the event that multiple shapes of the style vector artwork have a pattern and occupy a same area of a shape of the content vector artwork (e.g., equally cover the shape of the content vector artwork), style transfer module 156 may determine the pattern ID from one of the multiple shapes having a largest area. Additionally or alternatively, style transfer module 156 may determine the pattern ID from one of the multiple shapes having a lowest shape designator. Additionally or alternatively, style transfer module 156 may determine the pattern ID based on a z-order of the multiple shapes. For instance, style transfer module 156 determines the pattern ID from one of the multiple shapes on top (e.g., with a highest z-order).

Style transfer module 156 determines a fill content for a shape as a gradient when style transfer module 156 does not determine the fill content as a pattern, and of the shapes of the style vector artwork that overlap the shape of the content vector artwork, shapes having gradients occupy more of the area of the shape of the content vector artwork than shapes having solid fills. For instance, if first and second shapes of a style vector artwork have gradients and occupy forty percent (40%) and fifty percent (50%), respectively, of a shape of the content vector artwork, and the first and second shapes overlap one another for ten percent (10%) of the shape of the content vector artwork, then the area of the shape that is occupied by shapes of the style vector artwork that have gradients is 40%+50%−10%=eighty percent (80%). In this example, if a third shape having a solid fill occupies less than 80% of the shape of the content vector artwork, then style transfer module 156 determines the fill content for the shape as a gradient.

When style transfer module 156 determines a fill content for a shape as a gradient, style transfer module 156 determines an angle (e.g., a slope) of the gradient for each of the shapes of a style vector artwork having gradients that overlap the shape of the content vector artwork. Style transfer module 156 can determine the angle of a gradient in any suitable way. In one example, style transfer module 156 obtains endpoints of a line along which a gradient is to be applied. For instance, style transfer module 156 may determine the endpoints from a gradient map included in a style map for the style vector artwork. Suppose the endpoints for a gradient are denoted by (x1,y1) and (x2,y2). Style transfer module 156 can determine the angle of the gradient, $\theta$, according to $$\theta = \tan^{-1}\frac{y2-y1}{x2-x1}.$$

To determine a direction of the gradient to be applied to a shape of the content vector artwork, style transfer module 156 maps the angle $\theta$ to new endpoints in the content vector artwork. Style transfer module 156 can map the angle of the gradient for a shape in a style vector artwork to endpoints of the gradient to be applied to a shape in a content vector artwork in any suitable way, such as by applying a linear transformation (e.g., including a translation, a rotation, or both a translation and a rotation), a non-linear function (e.g., a clamping function, an exponential function, a logarithmic function, a trigonometric function, etc.), combinations thereof, and the like. In one example, style transfer module 156 maps the angle $\theta$ to new endpoints $(\varphi_1, \gamma_1)$ and $(\varphi_2, \gamma_2)$ for the gradient to be applied to the shape from the content vector artwork according to $$(\varphi_1 = \lfloor \sin\theta \rfloor, \gamma_1 = \lfloor -\cos\theta \rfloor)$$

$$(\varphi_2 = \lfloor -\sin\theta \rfloor, \gamma_1 = \lfloor -\cos\theta \rfloor)$$

$$\text{where } \lfloor \delta \rfloor = \begin{cases} 0 \forall\ \delta < 0 \\ \delta \forall\ \delta \geq 0 \end{cases}$$

is a clamping function that keeps the endpoints within the range [0,1] so that the endpoints remain on an artboard for the vector artwork having horizontal and vertical dimensions limited to values between zero and one. The endpoints $(\varphi_1, \gamma_1)$ and $(\varphi_2, \gamma_2)$ define a direction of the gradient to be applied to a shape of the content vector artwork based on a gradient of a shape in the style vector artwork.

When multiple shapes of the style vector artwork have gradients and overlap a shape of the content vector artwork, style transfer module 156 determines the endpoints for a gradient to be applied to the shape of the content vector artwork from a vector sum of the gradients of the multiple shapes of the style vector artwork. In one example, style transfer module 156 determines an angle for the vector sum according to $$\theta = \tan^{-1}\frac{\Sigma_i(y2_i - y1_i)}{\Sigma_i(x2_i - x1_i)}$$

where $(x1_i, y1_i)$ and $(x2_i, y2_i)$ are endpoints of the gradient for the $i^{th}$ shape of the style vector artwork that overlaps the shape of the content vector artwork. Using the angle $\theta$ for the vector sum of the gradients of the shapes of the style vector artwork, style transfer module 156 determines new endpoints $(\varphi_1, \gamma_1)$ and $(\varphi_2, \gamma_2)$ for the gradient to be applied to the shape from the content vector artwork as described above.

Style transfer module 156 determines a fill content for a shape as a solid fill when style transfer module 156 does not determine the fill content as a pattern or a gradient. A solid fill determined by style transfer module 156 can also be used for a shape when a gradient is applied to the shape. For instance, the gradient may be applied to a fill color determined by style transfer module 156.

Style transfer module 156 can determine a fill color (e.g., to be used as a solid fill for a shape, or a fill color that has a gradient applied to it) in any suitable way. In one example, style transfer module 156 determines a fill color based on functions selections set by a user. For instance, a user may set a function selection from one of mean, median, mode, or whitening and coloring in a user interface of user interface module 144. In one example, when a user does not select a function selection as one of mean, median, mode, or whitening and coloring, style transfer module 156 is configured to select a default value of the function selection, such as mean.

When a style selection indicates a mean function is to be used to determine a fill color, style transfer module 156 determines the fill color for a shape of the content vector artwork based on an arithmetic average (e.g., a mean value)

determined from the fill colors of shapes of the style vector artwork that overlap the shape of the content vector artwork. In one example, style transfer module 156 determines the average value from the visual properties map Q, such as Fill Color(C)=Average(Q[C][Fill Color]).

Style transfer module 156 may determine the average using a weighted average, so that the contributions of each fill color in the weighted average are in proportion to the area of the shape of the content vector artwork overlapped by shapes of the style vector artwork. Additionally or alternatively, style transfer module 156 may determine the average based on a fill color of the shape designated in the content vector artwork. In one example, style transfer module 156 determines the fill color according to $$\text{Fill Color} = \frac{1}{N} \cdot \left( \beta \cdot FC + \sum_i \alpha_i \cdot FC_i \right)$$

where FC denotes the fill color of the shape designated in the content vector artwork, $FC_i$ denotes the fill color of the $i^{th}$ shape of the style vector artwork overlapping the shape of the content vector artwork, $\beta$ and $\alpha_i$ are combining weights, and N is an integer, such as the number of shapes of the style vector artwork overlapping the shape of the content vector artwork, this value minus one, or simply unity. In one example, style transfer module 156 sets the combining weights $\alpha_i$ proportional to the area of the shape of the content vector artwork overlapped by the $i^{th}$ shape of the style vector artwork.

Style transfer module 156 may also determine an opacity of the fill color based on an average of the opacities of the fill content of the shapes of the style vector artwork overlapping a shape of the content vector artwork. In one example, style transfer module 156 determines a fill opacity for a shape of the content vector artwork based on an arithmetic average (e.g., a mean value) determined from the fill opacities of shapes of the style vector artwork that overlap the shape of the content vector artwork. For instance, style transfer module 156 may determine the average value of the fill opacities from the visual properties map Q, such as Fill Opacity(C)=Average(Q[C][Fill Opacity]).

Like fill color, style transfer module 156 may determine the fill opacity with a weighted average, so that the fill opacities in the average are in proportion to the area of the shape of the content vector artwork that is overlapped by the shapes of the style vector artwork. Additionally or alternatively, an average value may be determined from vector style properties of shapes of a style vector artwork that overlap a shape of a content vector artwork without considering the amounts of overlap of the shapes. The fill opacity determined by style transfer module 156 may be applied to a solid fill, gradient, or pattern used as fill content for a shape.

When a function selection indicates a median function is to be used to determine a fill color, style transfer module 156 determines the fill color for a shape of the content vector artwork based on a median (e.g., a middle value) of the fill colors of shapes of the style vector artwork that overlap the shape of the content vector artwork. In one example, style transfer module 156 determines the median value from the visual properties map Q, such as Fill Color(C)=Median(Q[C][Fill Color]).

In one example, the visual properties map Q is populated for each point (e.g., pixel) of a shape of a style vector artwork that overlaps the shape of the content vector artwork. For instance, the visual properties map may include a fill color for each point of the shape of a style vector artwork that overlaps the shape of the content vector artwork. Hence, when style transfer module 156 determines the median value, more weight can be given to those shapes of the style vector artwork having larger areas of overlap with the shape of the content vector artwork than shapes of the style vector artwork having smaller areas of overlap with the shape of the content vector artwork.

Style transfer module 156 may also determine a fill opacity for a shape of the content vector artwork based on a median function (e.g., a middle value value) determined from the fill opacities of shapes of the style vector artwork that overlap the shape of the content vector artwork. For instance, style transfer module 156 may determine the median value of the fill opacities from the visual properties map Q, such as Fill Opacity(C)=Median(Q[C][Fill Opacity]).

Since the visual properties map Q may be populated for each point of a shape of a style vector artwork that overlaps the shape of the content vector artwork, the median value of opacity may be determined by giving more weight to those shapes of the style vector artwork having larger areas of overlap with the shape of the content vector artwork than shapes of the style vector artwork having smaller areas of overlap with the shape of the content vector artwork. Additionally or alternatively, a median value may be determined from vector style properties of shapes of a style vector artwork that overlap a shape of a content vector artwork without considering the amounts of overlap of the shapes.

When a function selection indicates a mode function is to be used to determine a fill color, style transfer module 156 determines the fill color and opacity for a shape of the content vector artwork based on an arithmetic mode (e.g., a most-frequently occurring fill color and opacity) from the fill colors and opacities, respectively, of shapes of the style vector artwork that overlap the shape of the content vector artwork. In one example, style transfer module 156 determines the fill color and opacity from the visual properties map Q, such as Fill Color(C)=Mode(Q[C][Fill Color])

Fill Opacity(C)=Mode(Q[C][Fill Opacity]).

Since the visual properties map Q may be populated for each point of a shape of a style vector artwork that overlaps the shape of the content vector artwork, the values for fill color and fill capacity opacity may be determined by giving more weight to those shapes of the style vector artwork having larger areas of overlap with the shape of the content vector artwork than shapes of the style vector artwork having smaller areas of overlap with the shape of the content vector artwork.

Additionally or alternatively, a mode value may be determined from vector style properties of shapes of a style vector artwork that overlap a shape of a content vector artwork without considering the amounts of overlap of the shapes. For instance, if four shapes of a style vector artwork overlap a shape of a content vector artwork, and the four shapes include three blue and one red shape, style transfer module 156 determines the mode value of the fill colors as blue independent from the amount of overlap for the four shapes, since the color blue occurs three times and the color red occurs once among the four shapes.

When a function selection indicates a whitening and coloring function is to be used to determine a fill color, style transfer module 156 determines the fill color by applying a whitening and coloring transformation to fill color maps determined from the style maps of the content vector artwork and the style vector artwork. For instance, style transfer module 156 generates a first fill color map for the content vector artwork and a second fill color map for the style vector artwork by extracting the fill colors at each point of the style maps. Style transfer module 156 applies a whitening and coloring transformation to the fill color maps by applying a whitening transformation to the first color map, and applying a coloring transformation to results of applying the whitening transformation. The whitening transformation whitens the first color map so that the results of applying the whitening transformation have an identity matrix as a covariance matrix. The coloring transformation colors the results of applying the whitening transformation so that the second color map and results of applying the coloring transformation have matching covariance matrices.

To illustrate how style transfer module 156 applies a whitening and coloring transformation, let $f_c$ and $f_s$ denote color maps extracted from the style maps of the content vector artwork and the style vector artwork, respectively. The covariance statistics of the color map $f_c$ of the content vector artwork can be expressed by the covariance matrix $f_c f_c^T$. In one example, style transfer module 156 subtracts the mean vector of the color map $f_c$ from the color map $f_c$ by setting $f_c = f_c - m_c$ for mean vector $m_c$. Style transfer module 156 may perform a decomposition of the covariance matrix of the color map of the content vector artwork $f_c$, such as a singular value decomposition, so that the covariance matrix of the color $f_c$ map can be expressed as $$f_c f_c^T = E_c D_c E_c^T$$

where $D_c$ is a diagonal matrix with eigenvalues of the covariance matrix of the color map $f_c$ and $E_c$ is a matrix of eigenvectors of the covariance matrix of the color map $f_c$.

Style transfer module 156 transforms the color map of the content vector artwork $f_c$ by applying a linear transformation determined from the decomposition of the covariance matrix of the color map $f_c$ to generate a whitened map, $$\hat{f}_c = E_c D_c^{-1/2} E_c^T f_c.$$

Here, $E_c D_c^{-1/2} E_c^T$ is a linear transformation that whitens the color map of the content vector artwork $f_c$ so that $\hat{f}_c \hat{f}_c^T = I$, an identity matrix.

Style transfer module 156 generates a fill color map $f_{fill}$ for the shape of the content vector artwork from the whitened map $\hat{f}_c$ by applying a linear transformation to the whitened map that sets the covariance matrix of the fill color map $f_{fill}$ to match the covariance matrix of the color map of the style vector artwork $f_s$. For instance, style transfer module 156 may subtract the mean vector of the color map of the style vector artwork from the color map by setting $f_s = f_s - m_s$ for mean vector $m_s$. Style transfer module 156 performs a decomposition of the covariance matrix of the color map (e.g., with the mean vector removed), such as a singular value decomposition. Hence, style transfer module 156 may represent the covariance matrix of the color map of the style vector artwork as $$f_s f_s^T = E_s D_s E_s^T$$

where $D_s$ is a diagonal matrix with eigenvalues of the covariance matrix of the color map of the style vector artwork $f_s$ and $E_s$ is a matrix of eigenvectors of the covariance matrix of the color map of the style vector artwork $f_s$.

Style transfer module 156 applies a linear transformation determined from the decomposition of the covariance matrix of the color map of the style vector artwork to the whitened map to generate a fill color map, $$f_{fill} = E_s D_s^{-1/2} E_s^T \hat{f}_c.$$

Here, $E_s D_s^{-1/2} E_s^T$ is a linear transformation that colors the whitened map $\hat{f}_c$ so that the fill color map has the same covariance matrix as the color map of the style vector artwork, $f_{fill} f_{fill}^T = f_s f_s^T$. In one example, style transfer module 156 adds the mean vector of the color map to the fill color map by setting $f_{fill} = f_{fill} + m_s$. Style transfer module 156 can set the fill colors of shapes of the content vector artwork from the colors of the fill color map $f_{fill}$.

Stroke Properties

When transfer style selections, A, denotes that a vector style property including a stroke vector property is to be transferred to a shape of a content vector, style transfer module 156 determines the vector style property of the stroke to transfer based on the stroke vector properties of the shapes of the style vector artwork and the area of the shapes of the content style artwork overlapped by the shapes of style vector artwork. Stroke vector properties can include any suitable vector property related to a stroke of a shape. A stroke of a shape refers to a border of a shape (e.g., the stroke of a pen used to outline a shape). Stroke vector properties can include stroke color, stroke opacity, stroke width, and stroke dashing (e.g., type of dashing and spacing of the dashing).

When transfer style selections denotes that a vector style property including a stroke color or stroke opacity is to be transferred to a shape of a content vector artwork, style transfer module 156 determines a stroke color, stroke opacity, or both, for the shape the content vector artwork from the shapes of the style vector artwork that overlap the shape of the content vector artwork. For instance, style transfer module 156 may determine a stroke color and opacity using a mean function, a median function, or a mode function, as described above. A user may specify via a user interface of user interface module 144 to use one of a mean function, a median function, or a mode function when computing stroke color, stroke opacity, or both stroke color and stroke opacity. In one example, if a user does not specify a function to use when transferring a stroke color to a shape of a content vector artwork, style transfer module 156 selects a mean function (e.g., statistical average or expected value). Hence, style transfer module 156 may determine a stroke color and a stroke opacity for a shape of a content vector artwork from the visual properties map Q according to Stroke Color(C)=Average(Q[C][Stroke Color])

Stroke Opacity(C)=Average(Q[C][Stroke Opacity]).

Since the visual properties map Q may or may not be populated for each point of a shape of a style vector artwork that overlaps the shape of the content vector artwork, the values for stroke color and stroke opacity may or may not be based on the amount of overlap area. In one example, style transfer module 156 determines a stroke color and a stroke opacity by averaging stroke colors and stroke opacities, respectively, of shapes of a style vector artwork that overlap a shape of a content vector artwork, and the averaging is not weighted based on the amounts of overlap of the shapes of the style vector artwork with the shape of a content vector artwork.

When transfer style selections denotes that a vector style property including a stroke width is to be transferred to a shape of a content vector artwork, style transfer module 156 determines a stroke width for the shape from the shapes of the style vector artwork that overlap the shape. So that the stroke width for the shape appears natural and in proportion to the size of the shape, style transfer module 156 may determine the stroke width for the shape of a content vector artwork according to the stroke widths of shapes of the style vector artwork that overlap the shape of the content vector artwork, normalized by the area of the shape of the content vector artwork. In one example, style transfer module 156 determines a stroke width for a shape of a content vector artwork according to $$StrokeWidth(C) = \frac{Area(C) \cdot mean(StrokeWidth(S)) \cdot \sum_i \frac{StrokeWidth(S_i)}{Area(S_i)}}{Count(S) \cdot norm(StrokeWidth(S))}$$

where C denotes a shape designator for a shape in the content vector artwork, S denotes a shape designator for a shape in the style vector artwork that overlaps C, $S_i$ is the $i^{th}$ shape in the set of shapes S, and $norm(x) \equiv (\Sigma_i x_i^2)^{1/2}$. The stroke widths of the shapes S can be determined from the visual properties map Q, such as by StrokeWidth(S)=Q[S][Stroke Width].

When transfer style selections denotes that a vector style property including a stroke dashing is to be transferred to a shape of a content vector artwork, style transfer module 156 determines a stroke dashing for the shape from the shapes of the style vector artwork that overlap the shape the content vector artwork. A stroke dashing may include parameters defining a type of dashes, such as length of dashes, size of dots, combinations of dashes and dots, a distance between dashes, dots, or dashes and dots, solid stroke (e.g., no dashes, or space between dashes is zero), etc. Hence, style transfer module 156 determines a stroke dashing for the shape from the shapes of the style vector artwork that overlap the shape and that have a non-zero stroke width. In one example, style transfer module 156 determines a stroke dashing for a shape C of a content vector artwork based on the visual properties map Q, such as by Stroke Dashing(C)=Average(Q[C][Stroke Dashing])
iff Q[C][Stroke Width]>0.

Additionally or alternatively, style transfer module 156 may use an average function, median function, or mode function to compute the stroke dashing based on a user selection designating a type of function to use when transferring a stroke dashing vector style property to a shape of a content vector artwork.

Additional Vector Style Properties

Style transfer module 156 is not limited to transferring fill content vector properties and stroke vector properties form one vector artwork to another vector artwork. Style transfer module 156 can transfer any suitable vector attribute to a shape of a vector artwork, such as shadow vector properties (e.g., parameters that define a shadow of a shape, such as a size of a shadow expressed as a percentage of a size of the shape, an offset of a shadow, an opacity of a shadow, etc.), text properties of a shape (e.g., font type, size, bold, italics, etc. of text of a shape), logo vector properties (e.g., for shapes including logos, a logo of a shape of a style vector artwork may be transferred to a shape of a content vector artwork based on the overlap area of the two shapes), reflection vector properties (e.g., parameters that define a reflection of a shape, such as a size of a reflection, a direction of a reflection, a light source for a reflection, an opacity of a reflection, a texture of a surface causing a reflection, etc.), glow vector properties (e.g., parameters that define a glow, aura, or halo of a shape, such as a size of a glow of a shape, an offset or direction of a glow, a brightness and color of a glow, etc.), and the like.

Style transfer module 156 populates a styled shapes map with vector style properties for shapes of a content vector artwork, such as vector style properties including fill content attributes, stroke attributes, shadow attributes, etc. For instance, a styled shapes map generated by style transfer module 156 may be of the form $S_{StyledShapes}$={Shape designator: fill color, fill opacity, stroke color, stroke opacity, stroke width, stroke data, gradient parameters, pattern ID}.

The vector style properties in a styled shapes map can be used to generate a stylized vector artwork that includes shapes of a content vector artwork having styles based on vector style properties in the styled shapes map. The vector style properties in the styled shapes map are based on shapes of a style vector artwork that overlap shapes of a content vector artwork, and style transfer attributes (e.g., user selections) that define what vector style properties to transfer and functions used to determine the vector style properties (e.g., mean, median, and mode selections).

Styled shapes maps generated by style transfer module 156, along with any suitable information, such as style selections (e.g., user selections of functions like mean, median, and mode, user selections of style vector properties to transfer to a shape of a content vector artwork, etc.), style maps, overlap maps, visual properties maps, combining weights, norms, areas, results of sums, combinations thereof, and the like, used by or calculated by style transfer module 156 are stored in style transfer data 134 of storage 126 and made available to modules of artwork editing application 142. In one example, style transfer module 156 provides a styled shapes map to vector artwork module 158.

Vector artwork module 158 is representative of functionality configured to generate a vector artwork that includes a shape of a content vector having vector style properties determined from shapes of a style vector artwork. Vector artwork module 158 generates a vector artwork, e.g., a stylized vector artwork, from a styled shapes map generated by style transfer module 156. For instance, vector artwork module 158 may obtain a content vector artwork and update the content vector artwork by writing vector style properties from the styled shapes map to the content vector artwork to generate a stylized vector artwork.

Additionally or alternatively, vector artwork module 158 may apply vector style properties from the styled shapes map to paths of the content vector artwork to generate a stylized vector artwork. When applying the new vector style properties, vector artwork module 158 may perform traversal in the form of depth first search on the element-tree of the stylized vector artwork. Vector artwork module 158 may then write the vector style properties onto a vector of the element-tree corresponding to the shape designator indicated in the styled shapes map. Vector artwork module 158 may provide a stylized vector artwork to user interface module 144, which can render the artwork in a user interface.

In one example, vector artwork module 158 receives combining parameters to mix an original vector style property (e.g., a vector style property designated in a content vector artwork) and an updated vector property (e.g., a vector style property included in a styled shapes map generated by style transfer module). For instance, a user may specify a transfer percentage in a user interface of user interface module 144, and vector artwork module 158 may combine the original vector style property and the updated vector styled property in proportion to the transfer percentage, and generate the stylized vector artwork according to the combined vector style property. In an example, a user may specify a transfer percentage of twenty-five percent (25%) for a fill color vector style property. If the original color of a shape in the content vector artwork is blue, and the fill color for the shape in the styled shapes map is pink, vector artwork module 158 may determine a color for the shape in the stylized vector artwork as 0.75·Blue+0.25·Pink.

Accordingly, vector artwork module 158 allows a user to set the amount of a vector style property that is transferred to a shape of a content vector artwork. In one example, a user can set a transfer percentage for each vector style property for each shape of a content vector artwork. Hence, a designer can flexibly transfer the vector style properties of shapes of a style vector artwork to shapes of a content vector artwork. Additionally or alternatively, vector artwork module 158 may limit a user to setting one transfer percentage for each shape of a content vector artwork. For instance, based on a user's experience level to distinguish novice users from advanced users, novice users may be presented a user interface that limits the number of transfer percentages, such as one transfer percentage per shape of a content artwork, or one transfer percentage for an entire content vector artwork. Advanced users, however, may be presented a user interface that provides multiple transfer percentage options, such as setting a different transfer percentage for each vector style property, for each shape of a content vector artwork, or combinations thereof.

A stylized vector artwork generated by vector artwork module 158, along with any suitable information, such as styled shapes maps, content vector artwork, combining parameters (e.g., transfer percentages), numbers of vector style attributes modified in a styled shapes map, combinations thereof, and the like, used by or calculated by vector artwork module 158 are stored in vector artwork data 136 of storage 126 and made available to modules of artwork editing application 142. In one example, vector artwork module 158 provides a stylized vector artwork to user interface module 144, which renders the stylized vector artwork in a user interface.

Having considered an example digital medium environment, consider now a discussion of an example system usable to transfer vector style properties to a vector artwork in accordance with one or more aspects of the disclosure.

Example Artwork Editing System

Figure 4:
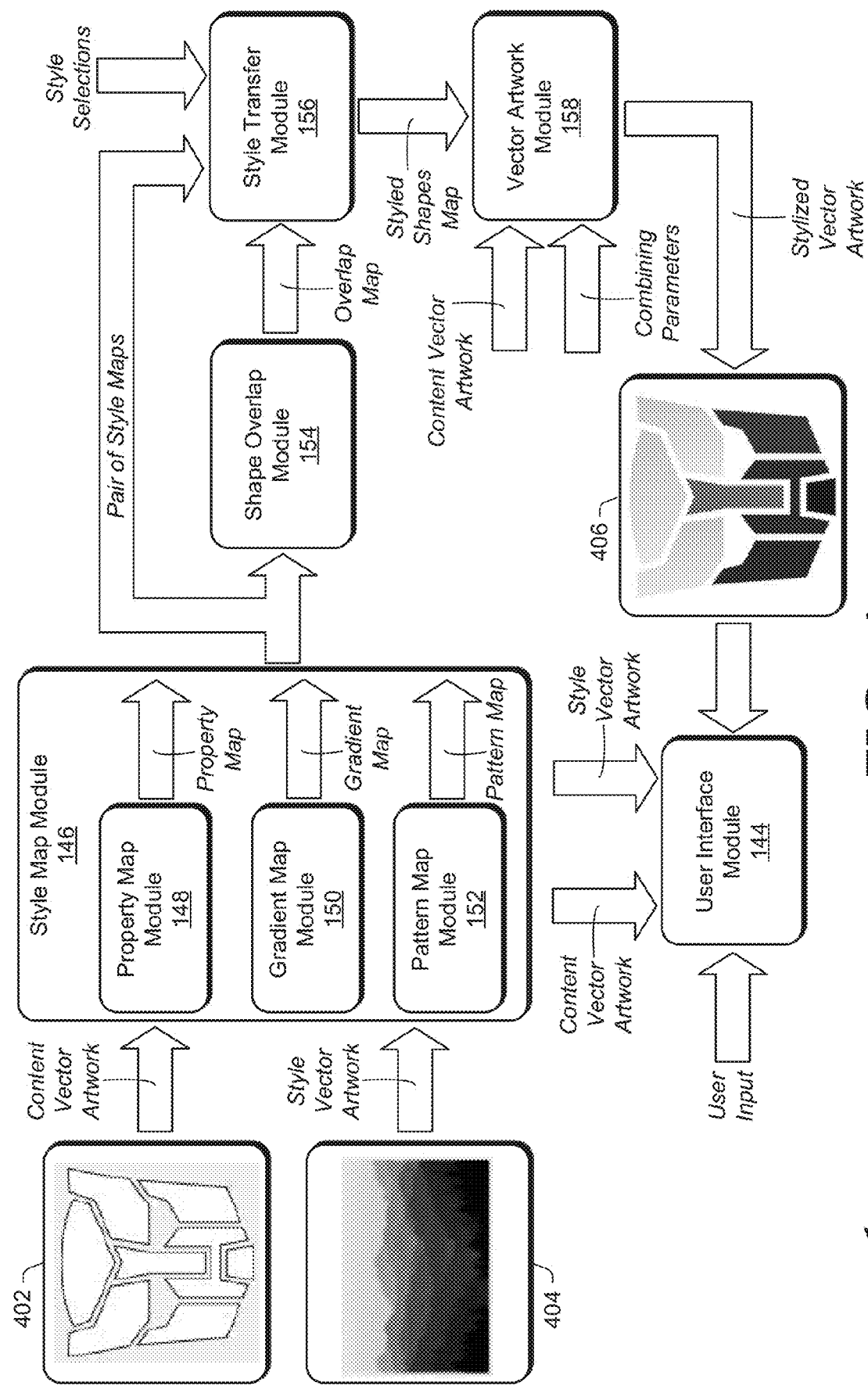
FIG. 4 illustrates an example system usable to transfer vector style parameters to a vector artwork in accordance with one or more aspects of the disclosure.

FIG. 4 illustrates an example system 400 usable to transfer vector style properties to a vector artwork (e.g., from a style vector artwork to a content vector artwork) in accordance with one or more aspects of the disclosure. In this implementation, system 400 includes the modules of artwork editing application 142 as described in FIG. 1, e.g., user interface module 144, style map module 146, property map module 148, gradient map module 150, pattern map module 152, shape overlap module 154, style transfer module 156, and vector artwork module 158. System 400 is one example of artwork editing system 106 that can be constructed using the modules of artwork editing application 142. For instance, signals can be redefined, and modules can be modified, combined, divided, added, or removed to form a modified system, without altering the functionality of system 400. Accordingly, such modified systems are considered to be within the scope of the disclosure.

Furthermore, for simplicity, system 400 is limited to the modules of artwork editing application 142 and a description of some of their interconnects. System 400 can, however, include any suitable signals and communications between modules omitted for simplicity. Such signals may include system clocks, counters, shape indicators, sequence indicators, reset signals, artwork indicators, and the like. In one example, system 400 can operate in real time (e.g., with no perceptible delay to a user). Accordingly, signals can be calculated by the modules of system 400 and communicated between the modules of system 400 without significant delay, so that an artwork may be edited and the results exposed in a user interface without perceptible delay to a user. For instance, vector style properties from a style vector artwork may be transferred to shapes of a content vector artwork to generate a stylized vector artwork without perceptible delay to a user.

Moreover, system 400 can be implemented on any suitable device or devices. In one example, system 400 is implemented on one computing device (e.g., computing device 104 in FIG. 1). In another example, system 400 is implemented on more than one computing device. For instance, parts of system 400 can be implemented by a first computing device, such as one computing device of computing device 104 in FIG. 1, and other parts of system 400 can be implemented by an additional computing device or devices, such as another computing device of computing device 104. In one example, a server implements parts of system 400, such as server 116 in FIG. 1. A server can be remote, e.g., because it is not collocated with the first computing device. A server may be configured to receive signals of system 400 from a computing device (e.g., computing device 104), process the received signals, such as with artwork editing support system 118, and transmit results of the processing back to the computing device. Hence, artwork editing support system 118 of server 116 in FIG. 1 may include an instantiation of system 400.

Additionally or alternatively, parts of system 400 can be implemented by an additional computing device that is collocated with a first computing device. For instance, one device of computing device 104 may be a first computing device, and another device of computing device 104 may be an additional, collocated computing device. The first computing device and the additional computing device may be operated by one or more users. Hence, system 400 provides for multiple users within an environment to share data included in system 400.

System 400 obtains content vector artwork 402 and style vector artwork 404, and generates stylized vector artwork 406, in which the style vector properties of the style vector artwork 404 are transferred to the shapes of the content vector artwork 402. System 400 can obtain the content vector artwork 402 and the style vector artwork 404 in any suitable way. In one example, a user provides the content vector artwork 402 and the style vector artwork 404, such as by selecting thumbnail representations of the artworks in a user interface of user interface module 144, or loading the content vector artwork 402 and the style vector artwork 404 into system 400 from memory. Additionally or alternatively, system 400 can obtain the content vector artwork 402 and the style vector artwork 404 from a database of artworks, such as a dataset of stock images and artworks (e.g., from a database hosted by a server, such as server 116).

The content vector artwork 402 and the style vector artwork 404 are provided to user interface module 144. User interface module 144 may render and expose the content vector artwork 402 and the style vector artwork 404 in a user interface. In one example, a user enables system 400 to transfer the vector style properties of the style vector artwork 404 to the content vector artwork 402, such as by selecting an option exposed in a user interface of user interface module 144 (e.g., a "transfer now" button, an indicator of a vector style property to transfer, or combinations thereof). The content vector artwork 402 and the style vector artwork 404 are provided to style map module 146.

Style map module 146 receives the content vector artwork 402 and the style vector artwork 404. In one example, style map module 146 separately processes the content vector artwork 402 and the style vector artwork 404 and generates separate style maps for each of the content vector artwork 402 and the style vector artwork 404. For instance, property map module 148 may generate a first property map for the content vector artwork 402 and a second property map for the style vector artwork 404. Gradient map module 150 may generate a first gradient map for the content vector artwork 402 and a second gradient map for the style vector artwork 404. Pattern map module 152 may generate a first pattern map for the content vector artwork 402 and a second pattern map for the style vector artwork 404. Style map module 146 may combine the first property map, the first gradient map, and the first pattern map into a first style map for the content vector artwork 402, and combine the second property map, the second gradient map, and the second pattern map into a second style map for the style vector artwork 404.

Style maps generated by style map module 146 include shape designators and vector style properties for shapes designated by the shape designators. In one example, style map module 146 generates style maps by first flattening shapes of a vector artwork into line segments, and scanning the vector artwork with scanlines to determine points that belong to (e.g., occupy) shapes of the vector artwork. For each point, a style map may include a shape designator found from the scanning, and a list of properties extracted from the vector artwork for the shape designated by the shape designator at the point. Style map module 146 provides a pair of style maps (e.g., a first style map for the content vector artwork 402 and second style map for the style vector artwork 404) to shape overlap module 154 and style transfer module 156.

Shape overlap module 154 receives a pair of style maps from style map module 146, and overlays (e.g., virtually mounts) the style vector artwork 404 on the content vector artwork 402. Hence, shape overlap module 154 may also obtain the content vector artwork 402 and the style vector artwork 404. Shape overlap module 154 may overlay the style vector artwork 404 on the content vector artwork 402 by resizing at least one of the content vector artwork 402 and the style vector artwork 404 so they are of a same size (e.g., same height, width, or both height and width) and electronically placing the style vector artwork 404 on the content vector artwork 402.

Using the pair of style maps received from style map module 146, shape overlap module 154 generates an overlap map from the virtually-mounted artworks. An overlap map includes descriptions of shapes of the style vector artwork that overlap shapes in the content vector artwork, and an amount of area of the overlap for each of the shapes of the style vector artwork. In one example, shape overlap module 154 generates a visual properties map Q that includes visual properties (e.g., vector style properties) of shapes of the style vector artwork that overlap shapes of the content vector artwork. Shape overlap module 154 provides an overlap map to style transfer module 156.

Style transfer module 156 receives an overlap map from shape overlap module 154 and a pair of style maps from style map module 146, and generates a styled shapes map. Style map module 146 may also receive style selections indicating vector style properties to transfer to shapes of the content vector artwork from shapes of the style vector artwork, such as user selections from user interface module 144. For instance, style selections may include user selections of at least one of fill content, stoke color, stroke width, and stroke dashing to transfer these vector style properties. Additionally or alternatively, style selections can include selections of a function to use when computing a vector style property (e.g., a function selection), such as a mean, median, mode, or whitening and coloring transform. In one example, style selections includes a designator that indicates whether an original fill color of a shape in content vector artwork 402 is to be used when computing a fill color for the shape in stylized vector artwork 406.

Style transfer module 156 generates a styled shapes map from the overlap map, pair of style maps, and style selections. A styled shapes map includes descriptions of shapes of content vector artwork 402 with vector style properties determined from shapes of style vector artwork 404. For instance, style transfer module 156 may generate a styled shapes map that designates a fill color for a shape (e.g., a part of the mask in content vector artwork 402) determined from a mixture of fill colors of shapes of the style vector artwork 404. The mixture may be determined from the fill colors of the shapes of the style vector artwork 404 in proportion to an amount of area overlap designated in the overlap map, so that shapes of the style vector artwork 404 that overlap more of the shape of the content vector artwork 402 are weighted more heavily in the mixture than shapes of the style vector artwork 404 that overlap less of the shape of the content vector artwork 402. Style transfer module 156 provides a styled shapes map to vector artwork module 158.

Vector artwork module 158 receives a styled shapes map from style transfer module 156. Vector artwork module 158 may also receive the content vector artwork 402 and combining parameters that include parameters indicating how to combine the vector style properties indicated in the styled shapes map with vector style properties indicated by the content vector artwork 402 (e.g., original vector style properties). For instance, combining parameters may include transfer percentages for one or more vector style properties, such as a user-selected transfer percentage from user interface module 144. A transfer percentage may indicate to mix a first percentage of a vector style property indicated in the styled shapes map with a second percentage of an original vector style property indicated by the content vector artwork 402. Hence, a user may fine-tune the transfer of a vector style property or attribute to a vector artwork.

Vector artwork module 158 generates a stylized vector artwork from the styled shapes map, content vector artwork 402, and combining parameters. The stylized vector artwork includes shapes of the content vector artwork having vector style properties determined from the vector style properties in the styled shapes map and from the combining parameters. In the example in FIG. 4, stylized vector artwork 406 includes the mask of the content vector artwork 402, and the shapes of the mask have been colored and a gradient applied based on the shapes in the landscape scene of the style vector artwork 404. The stylized vector artwork may be exposed in a user interface of user interface module 144.

The systems described herein constitute an improvement over systems that transfer style of one artwork to content of another artwork based on a neural network that processes raster graphics. Rather, the systems described herein directly process vector artworks and produce vector artworks, and therefore retain the scalability advantages of vector graphics over raster graphics. Moreover, the systems described herein do not rely on a neural network, but instead parse vector artworks to generate style maps for the vector artworks that are used to transfer vector style properties from one vector artwork to another vector artwork based on overlapping shapes in the vector artworks. Hence, the systems described herein do not require a costly training stage that consumes time and computer resources to train a neural network, are not limited to seen classes of objects used in a training dataset for the neural network, and do not suffer from information loss and distortions common to systems that use neural networks to transfer image style. Furthermore, the systems described herein can operate in real time to transfer vector style properties from one vector artwork to another vector artwork, unlike systems that introduce significant processing delay that precludes real-time operation. Moreover, the systems described herein include a user interface that allows a designer to select vector style properties to transfer from one vector artwork to another vector artwork, and a percentage of the vector style property that is transferred. Accordingly, a designer has the ability to transfer vector style properties of the designer's choice from one vector artwork to another vector artwork in a predictable and controllable fashion, unlike systems that use a neural network having no control or observability for the designer.

Having considered an example system usable to transfer vector style properties to a vector artwork, consider now a discussion of an example user interface in accordance with one or more aspects of the disclosure.

Example User Interface

Figure 5:
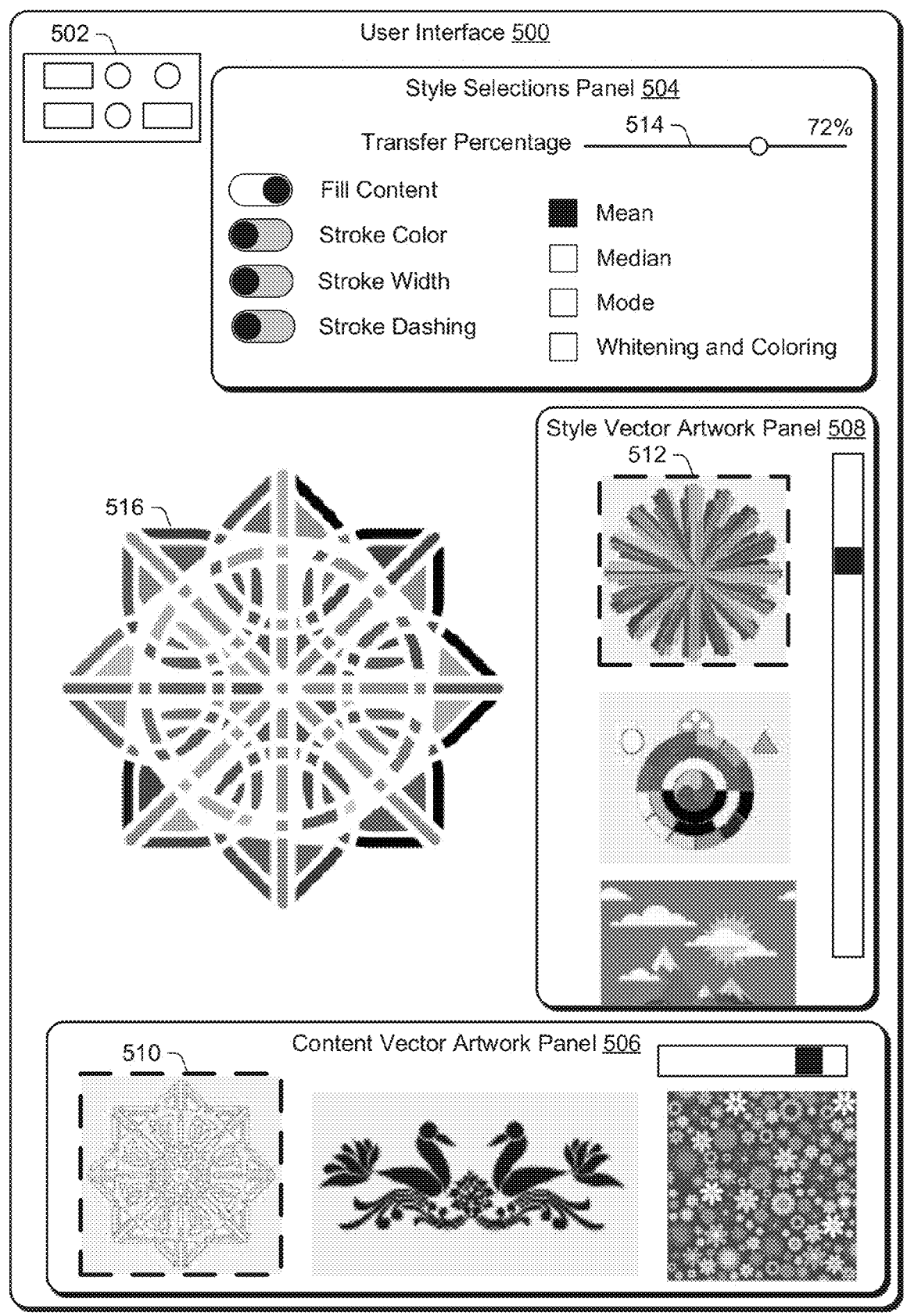
FIG. 5 illustrates an example user interface in accordance with one or more aspects of the disclosure.

FIG. 5 illustrates example user interface 500 in accordance with one or more aspects of the disclosure. User interface 500 is an example of a user interface generated and maintained by user interface module 144 in FIG. 1, and can be used to transfer vector style properties from one vector artwork to another vector artwork. User interface 500 includes controls 502, suitable to control user interface 500 and its content. Controls 502 can include any suitable control, such as adjusters for brightness, contrast, color, selection of filters, shading, crop, overlay, import, export, font type, size and color, language, zoom, artwork search, and the like. In one example, controls 502 include options to control display of panels of user interface 500.

User interface 500 can include any suitable data panels in any suitable position and shape. Data panels may expose any suitable data. User interface 500 includes style selections panel 504, content vector artwork panel 506, and style vector artwork panel 508. Content vector artwork panel 506 exposes representations of content vector artworks, such as thumbnail images of content vector artworks. Content vector artwork 108 in FIG. 1 is an example of a content vector artwork that can be represented in content vector artwork panel 506. Content vector artwork panel 506 includes a scroll bar to allow a user to scroll through multiple content vector artworks. In the example in FIG. 5, a user has selected content vector artwork 510 in content vector artwork panel 506. For instance, responsive to a user selection of content vector artwork 510, content vector artwork panel 506 may emphasize the representation of content vector artwork panel 506, such as by drawing a box around it (as is illustrated in FIG. 5), shading it, coloring it, etc. Content vector artwork 510 includes a geometric shape similar to a snowflake.

Style vector artwork panel 508 exposes representations of style vector artworks, such as thumbnail images of style vector artworks. Style vector artwork 110 in FIG. 1 is an example of a style vector artwork that can be represented in style vector artwork panel 508. Style vector artwork panel 508 includes a scroll bar to allow a user to scroll through multiple style vector artworks. In the example in FIG. 5, a user has selected style vector artwork 512 in style vector artwork panel 508. Responsive to a user selection of style vector artwork 512, style vector artwork panel 508 may emphasize the representation of style vector artwork panel 508, such as by drawing a box around it. Style vector artwork 512 includes artwork having multiple overlaid colored shapes.

Style selections panel 504 exposes options for transferring vector style properties from a style vector artwork to a content vector artwork. Style selections panel 504 can expose any suitable option for any suitable vector style property. In the example in FIG. 5, style selections panel 504 exposes options for transferring vector style properties including fill content, stroke color, stroke width, and stroke dashing. The option for fill content is illustrated as being selected, and the options for stroke color, stroke width, and stroke dashing are illustrated as not being selected. For instance, a user has selected the option for fill content to indicate that the fill content of style vector artwork 512 is to be transferred to the content vector artwork 510. A user may select any combination of vector style properties to transfer, and fill content is illustrated in FIG. 5 as an example.

Responsive to a user selection for the option of the fill content, style selections panel 504 exposes options for selecting a type of function used to compute the fill content. For instance, style selections panel 504 exposes options for mean, median, mode, and whitening and color functions that may be selected to compute a color of the fill content. In the example in FIG. 5, the mean function is selected, as indicated by the darkened indicator next to the "Mean" designator. Accordingly, a user has selected via style selections panel 504 to transfer fill content from the style vector artwork 512 to the content vector artwork 510 and to compute a color of the fill content by calculating an average of the fill colors of shapes in the style vector artwork 512 that overlap shapes in the content vector artwork 510. Style selections panel 504 also includes transfer percentage option 514. Transfer percentage option 514 includes a slider option that may be adjusted to set a transfer percentage. For instance, in the example in FIG. 5, the transfer percentage is set to seventy-two percent (72%).

Based on the user selections indicated in FIG. 5, user interface 500 exposes stylized vector artwork 516 that includes the artwork of the content vector artwork 510 (e.g., the shapes making up the geometric shape similar to a snowflake) with fill content determined from the fill colors of shapes of the style vector artwork. For instance, for each shape of the content vector artwork 510, shapes of the style vector artwork 512 that overlap the shape contribute to the fill color of the shape in the stylized vector artwork 516. The contribution of the fill color may be proportional to the amount of overlap, so that shapes of the style vector artwork 512 overlapping more of a shape of the content vector artwork 510 contribute more heavily to determining the fill color for the shape than shapes overlapping less of the shape of the content vector artwork 510. Furthermore, the fill colors of the style vector artwork 512 are transferred according to the transfer percentage indicated by transfer percentage option 514. Hence, the stylized vector artwork 516 includes fill content determined by combining twenty-eight percent (28%) of a color indicated by the content vector artwork 510 and seventy-two percent (72%) of a color determined from the style vector artwork 512. In the case where the content vector artwork 510 includes no fill color, the transfer percentage option 514 may be used to set a color saturation level for the fill color that is transferred from the style vector artwork 512 to the stylized vector artwork 516.

Having considered an example user interface usable to transfer vector style properties to a vector artwork, consider now a discussion of example images in accordance with one or more aspects of the disclosure.

Example Images

Figure 6:
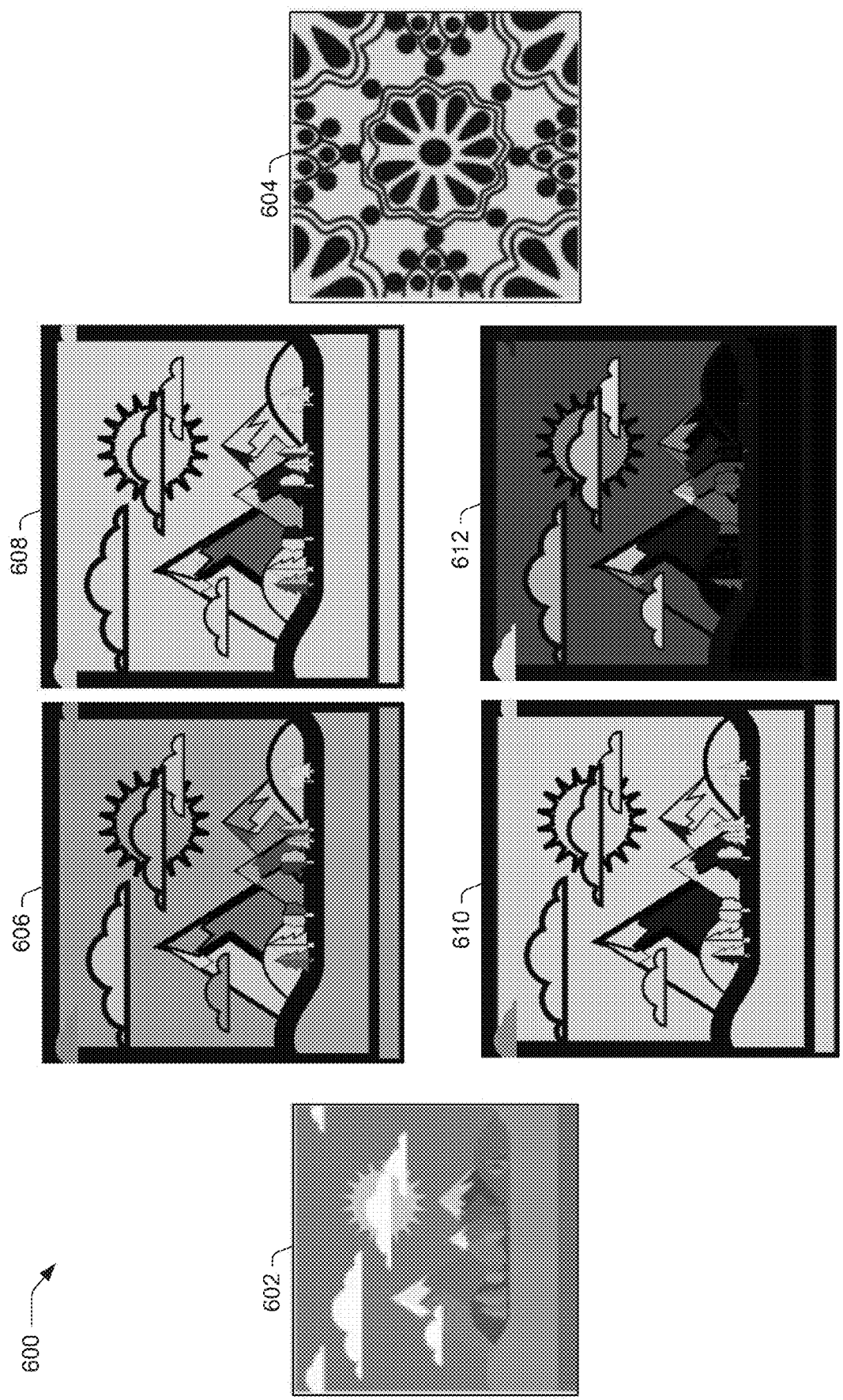
FIG. 6-FIG. 9 illustrate example vector artworks in accordance with one or more aspects of the disclosure.

FIG. 6 illustrates example vector artworks 600 in accordance with one or more aspects of the disclosure. Vector artworks 600 include content vector artwork 602 and style vector artwork 604. Content vector artwork 602 depicts a mountain landscape, and style vector artwork 604 depicts a graphic in a floral-like style.

Vector artworks 600 also include vector artwork 606, vector artwork 608, vector artwork 610, and vector artwork 612, which are examples of stylized vector artworks generated by artwork editing system 106 in FIG. 1 or system 400 in FIG. 4. In vector artworks 606-612, vector style properties have been transferred from the shapes of the style vector artwork 604 to the shapes of the content vector artwork 602. For instance, fill content, stroke color, and stroke width vector style properties have been transferred from the shapes of the style vector artwork 604 to the shapes of the content vector artwork 602 in vector artworks 606-612. Accordingly, the shapes of vector artworks 606-612 include different fill colors than their corresponding shapes in the content vector artwork 602, and the shapes in vector artworks 606-612 have stroke colors and widths determined from the stroke properties of the shapes in the style vector artwork 604.

Vector artworks 606-612 represent stylized vector artworks using different functions when determining fill content from the style vector artwork 604. For instance, in vector artwork 606 a mean function has been used to determine fill content, in vector artwork 608 a median function has been used to determine fill content, in vector artwork 610 a mode function has been used to determine fill content, and in vector artwork 612 a whitening and coloring transformation has been used to determine fill content. The different functions used to determine the fill content result in differences in the fill content of vector artworks 606-612. Accordingly, a designer may quickly and easily change the appearance of a vector artwork, simply by changing a selection of a function used to determine a fill content, such as by selecting one of mean, median, mode, or whitening and coloring functions.

Figure 7:
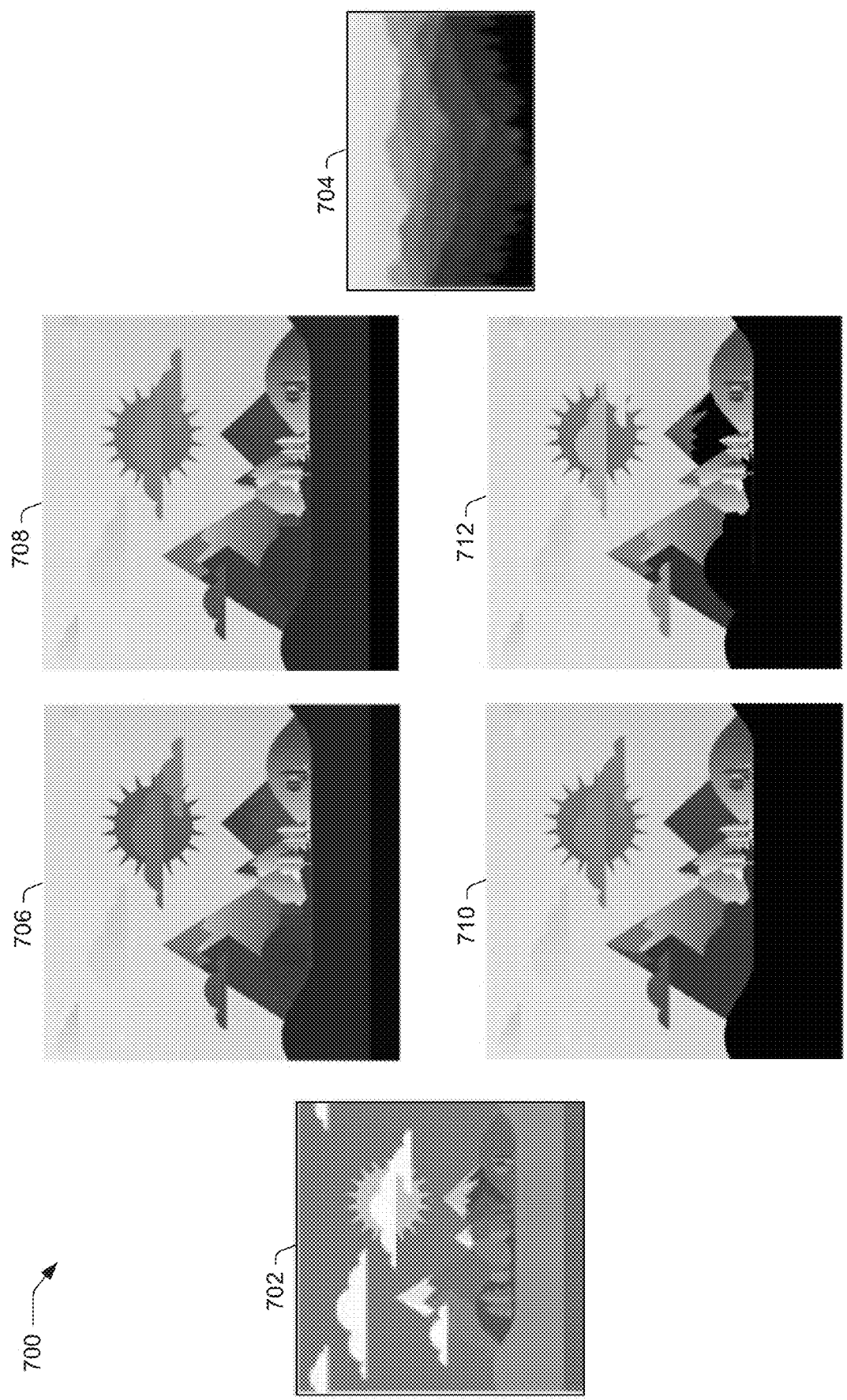

FIG. 7 illustrates example vector artworks 700 in accordance with one or more aspects of the disclosure. Vector artworks 700 include content vector artwork 702 and style vector artwork 704. Content vector artwork 702 depicts a mountain landscape (e.g., the same mountain landscape of FIG. 6), and style vector artwork 704 depicts another landscape with shapes having color gradients.

Vector artworks 700 also includes vector artwork 706, vector artwork 708, vector artwork 710, and vector artwork 712, which are examples of stylized vector artworks generated by artwork editing system 106 in FIG. 1 or system 400 in FIG. 4. In vector artworks 706-712, vector style properties have been transferred from the shapes of the style vector artwork 704 to the shapes of the content vector artwork 702. For instance, fill color and gradient vector style properties have been transferred from the shapes of the style vector artwork 704 to the shapes of the content vector artwork 702 in vector artworks 706-712. Accordingly, the shapes of vector artworks 706-712 include different fill colors than their corresponding shapes in the content vector artwork 702, with gradients applied based on the gradients of shapes in the style vector artwork 704. Furthermore, unlike the vector artworks 606-612 in FIG. 6, since stroke properties are not transferred in the example in FIG. 7 and the shapes of content vector artwork 702 have zero widths, vector artworks 706-712 also have strokes of zero width.

Vector artworks 706-712 represent stylized vector artworks using different functions when determining fill color from the style vector artwork 704. For instance, in vector artwork 706 a mean function has been used to determine fill color, in vector artwork 708 a median function has been used to determine fill color, in vector artwork 710 a mode function has been used to determine fill color, and in vector artwork 712 a whitening and coloring transformation has been used to determine fill color. The different functions used to determine the fill color result in differences in the fill colors of vector artworks 706-712. Accordingly, a designer may quickly and easily change the appearance of a vector artwork, simply by changing a selection of a function used to determine a fill content, such as by selecting one of mean, median, mode, or whitening and coloring functions.

Figure 8:
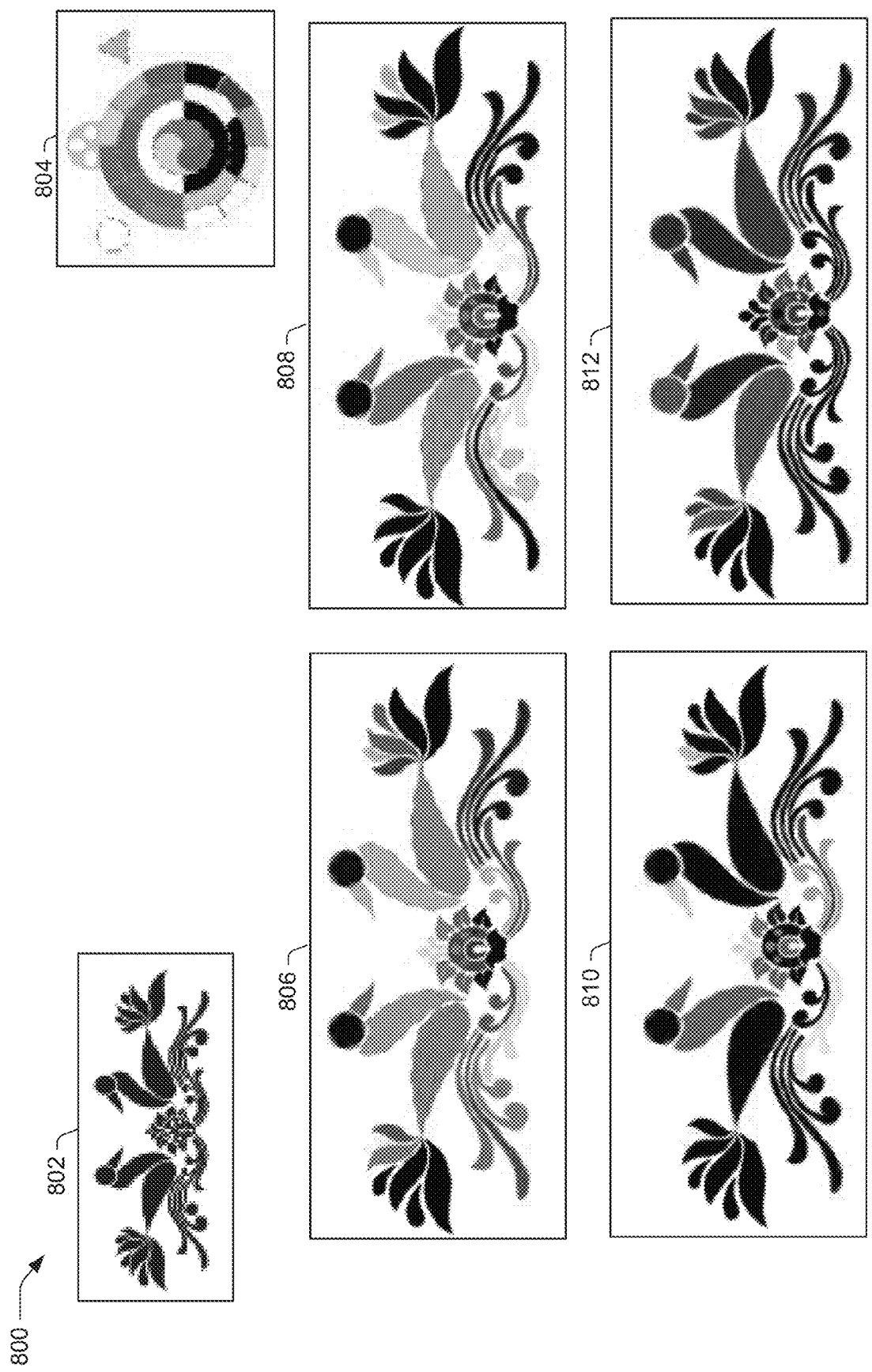

FIG. 8 illustrates example vector artworks 800 in accordance with one or more aspects of the disclosure. Vector artworks 800 include content vector artwork 802 and style vector artwork 804. Content vector artwork 802 depicts two birds, and style vector artwork 804 depicts a graphic with shapes having dashed strokes of different colors.

Vector artworks 800 also includes vector artwork 806, vector artwork 808, vector artwork 810, and vector artwork 812, which are examples of stylized vector artworks generated by artwork editing system 106 in FIG. 1 or system 400 in FIG. 4. In vector artworks 806-812, vector style properties have been transferred from the shapes of the style vector artwork 804 to the shapes of the content vector artwork 802. For instance, fill color, stroke color, and stroke dashing vector style properties have been transferred from the shapes of the style vector artwork 804 to the shapes of the content vector artwork 802 in vector artworks 806-812. Accordingly, the shapes of vector artworks 806-812 include different fill colors than their corresponding shapes in the content vector artwork 802, and the shapes in vector artworks 806-812 have strokes with colors and dashings determined from the stroke colors and dashings, respectively, of the shapes in the style vector artwork 804. In contrast, the shapes in content vector artwork 802 do not include stroke dashings.

Vector artworks 806-812 represent stylized vector artworks using different functions when determining fill color from the style vector artwork 804. For instance, in vector artwork 806 a mean function has been used to determine fill color, in vector artwork 808 a median function has been used to determine fill color, in vector artwork 810 a mode function has been used to determine fill color, and in vector artwork 812 a whitening and coloring transformation has been used to determine fill color. The different functions used to determine the fill color result in differences in the fill color of vector artworks 806-812. Accordingly, a designer may quickly and easily change the appearance of a vector artwork, simply by changing a selection of a function used to determine a fill content, such as by selecting one of mean, median, mode, or whitening and coloring functions.

Figure 9:
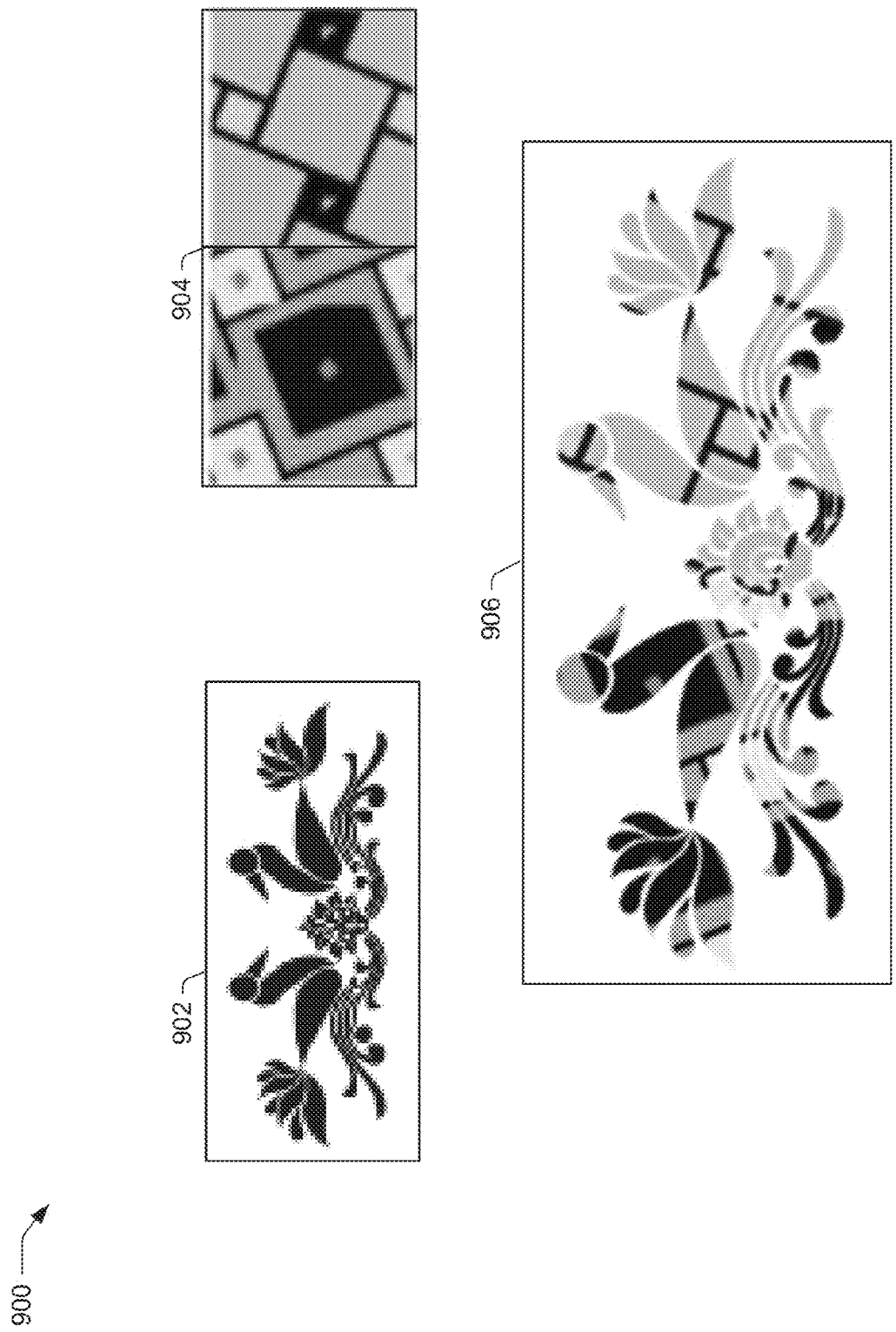

FIG. 9 illustrates example vector artworks 900 in accordance with one or more aspects of the disclosure. Vector artworks 900 include content vector artwork 902 and style vector artwork 904. Content vector artwork 902 depicts a graphic with two birds, and style vector artwork 904 depicts a graphic with two shapes (e.g., left and right rectangles) that each have patterns.

Vector artworks 900 also includes vector artwork 906, which is an example of a stylized vector artwork generated by artwork editing system 106 in FIG. 1 or system 400 in FIG. 4. In vector artwork 906, vector style properties have been transferred from the shapes of the style vector artwork 904 to the shapes of the content vector artwork 902. For instance, fill content of the shapes of the style vector artwork 904 has been transferred to the shapes of the content vector artwork 902 in vector artwork 906. Accordingly, the shapes of vector artwork 906 include fill content determined from one of the two patterns of the shapes of the style vector artwork 904. For instance, shapes on the left side of the vector artwork 906 are filled with the pattern from the left rectangle of style vector artwork 904, and shapes on the right side of the vector artwork 906 are filled with the pattern from the right rectangle of style vector artwork 904.

Having considered example vector artworks, consider now a discussion of example procedures for transferring vector style properties to a vector artwork in accordance with one or more aspects of the disclosure.

Example Procedures

Figure 10:
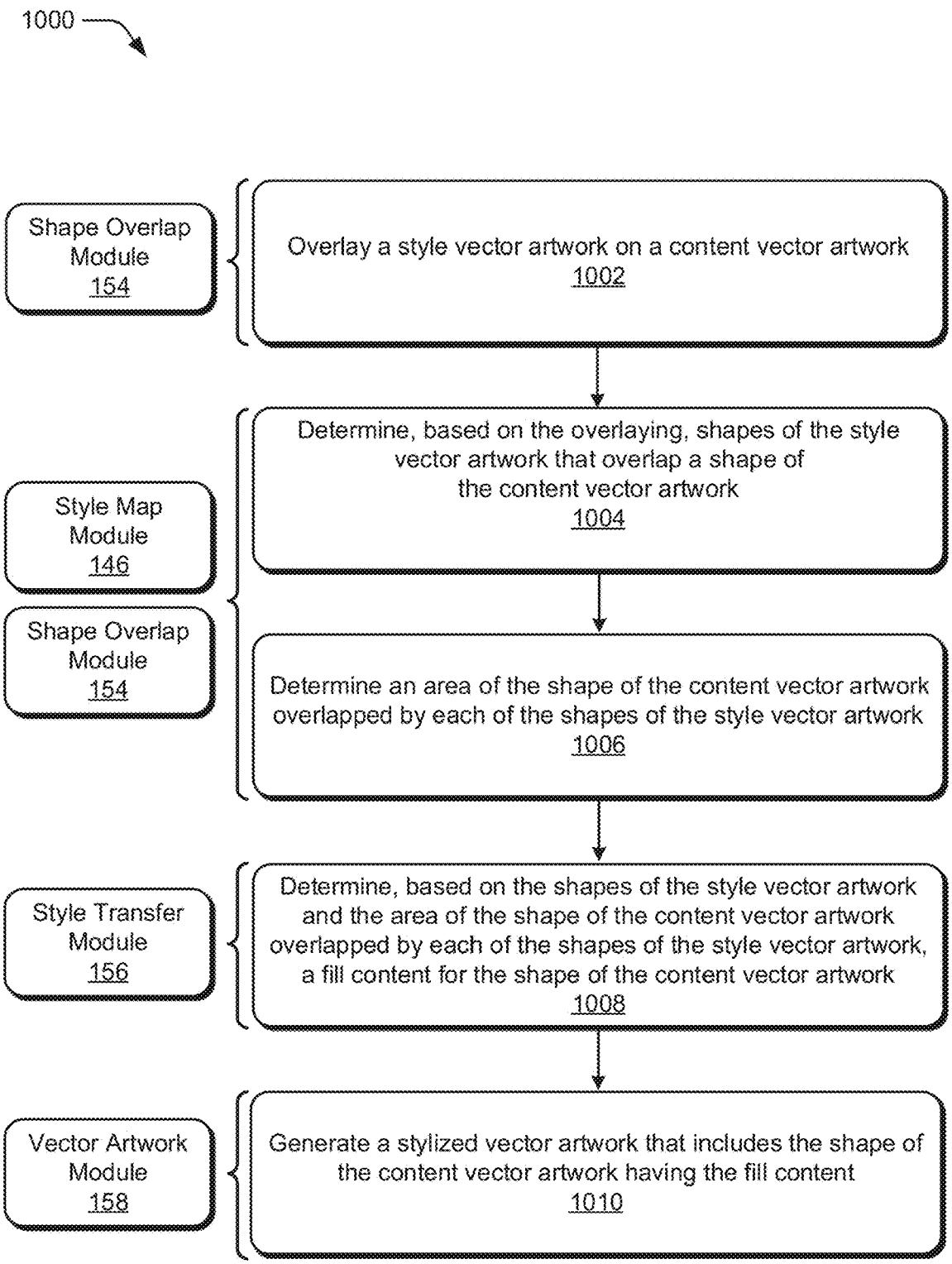
FIG. 10 illustrates a flow diagram depicting an example procedure in accordance with one or more aspects of the disclosure.

FIG. 10 illustrates an example procedure 1000 for transferring vector style properties to a vector artwork in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an artwork editing system, such as system 400 or artwork editing system 106. An artwork editing system implementing procedure 1000 may be an independent application that has been installed on the computing device, a service hosted by a service provider that is accessible by the computing device, a plug-in module to the computing device, or combinations thereof.

A style vector artwork is overlaid on a content vector artwork (block 1002). In one example, shape overlap module 154 overlays a style vector artwork on a content vector artwork. For instance, shape overlap module 154 may electronically overlay (e.g., virtually mount) a style vector artwork on a content vector artwork. Overlaying may include resizing at least one of the style vector artwork or the content vector artwork to have at least one of a same height or a same width as one another.

Based on the overlaying, shapes of the style vector artwork that overlap a shape of the content vector artwork are determined (block 1004). In one example, shape overlap module 154 determines, based on the overlaying, shapes of the style vector artwork that overlap a shape of the content vector artwork. For instance, shape overlap module 154 may determine shapes of the style vector artwork that overlap a shape of the content vector artwork using style maps for each of the style vector artwork and the content vector artwork generated by style map module 146.

An area of the shape of the content vector artwork overlapped by each of the shapes of the style vector artwork is determined (block 1006). In one example, shape overlap module 154 determines an area of the shape of the content vector artwork overlapped by each of the shapes of the style vector artwork. For instance, shape overlap module 154 may determine an area of the shape of the content vector artwork overlapped by each of the shapes of the style vector artwork using style maps for each of the style vector artwork and the content vector artwork generated by style map module 146. In one example, shape overlap module 154 generates an overlap map that includes designators of shapes of the style vector artwork that overlap a shape of the content vector artwork, and amounts of area of the overlap for each of the shapes of the style vector artwork.

Based on the shapes of the style vector artwork and the area of the shape of the content vector artwork overlapped by each of the shapes of the style vector artwork, a fill content for the shape of the content vector artwork is determined (block 1008). In one example, style transfer module 156 determines, based on the shapes of the style vector artwork and the area of the shape of the content vector artwork overlapped by each of the shapes of the style vector artwork, a fill content for the shape of the content vector artwork. For instance, style transfer module 156 may generate a styled shapes map that includes a fill content for the shape of the content vector artwork, the fill content determined based on the shapes of the style vector artwork and the area of the shape of the content vector artwork overlapped by each of the shapes of the style vector artwork.

In one example, determining the fill content for the shape of the content vector artwork includes at least one of determining the fill content as a pattern from one of the shapes of the style vector artwork, determining the fill content as a gradient from at least one of the shapes of the style vector artwork, or determining the fill content as a solid fill from one or more of the shapes of the style vector artwork. Additionally or alternatively, determining the fill content for the shape of the content vector artwork can be according to a prioritized order representing a higher priority for the pattern than the gradient or the solid fill and a lower priority for the solid fill than the pattern or the gradient. For instance, style transfer module 156 may determine the pattern as the fill content when shapes of the style vector artwork having patterns occupy more of an area of the shape of the content vector artwork than an area threshold, such as seventy percent (70%) of the area of the shape of the content vector artwork. Style transfer module 156 may determine the gradient as the fill content when the pattern is not determined as the fill content and, shapes of the style vector artwork having gradients occupy more of the area of the shape of the content vector artwork that is overlapped than shapes of the style vector artwork having solid fills. Style transfer module 156 may determines the solid fill as the fill content when the fill content is not determined as the pattern or the gradient.

A stylized vector artwork that includes the shape of the content vector artwork having the fill content is generated (block 1010). In one example, vector artwork module 158 generates a stylized vector artwork that includes the shape of the content vector artwork having the fill content. For instance, vector artwork module 158 may generate a stylized vector artwork from a styled shapes map generated by style transfer module 156 and the content vector artwork.

In one example, style transfer module 156 extracts vector style properties of the shapes from the style vector artwork. The vector style properties can include stroke widths of the shapes of the style vector artwork. A stroke width of the shape in the stylized vector artwork can determined from the stroke widths of the shapes of the style vector artwork and a total area of the shape of the content vector artwork. Additionally or alternatively, the vector style properties can include stroke dashing properties for at least one of the shapes of the style vector artwork having a non-zero stroke width. A stroke dashing property of the shape in the stylized vector artwork can be determined from an average of the stroke dashing properties for the at least one of the shapes of the style vector artwork having a non-zero stroke width.

In one example, vector style properties include stroke opacities and stroke colors of the shapes of the style vector artwork. A stroke opacity and a stroke color for the shape in the stylized vector artwork are determined from an average of the stroke opacities and an average of the stroke colors, respectively, of the shapes of the style vector artwork. Additionally or alternatively, the vector style properties can include fill colors of the shapes of the style vector artwork, and determining the fill content can include determining a color of the fill content from one of a mean, a median, or a mode of the fill colors of the shapes of the style vector artwork.

In an example, the vector style properties include fill opacities of the shapes of the style vector artwork. Determining the fill content includes determining an opacity of the fill content from one of a mean, a median, or a mode of the fill opacities of the shapes of the style vector artwork.

In one example, determining the fill content further includes determining the color of the fill content from the fill colors of the shapes of the style vector artwork in proportion to the area of the shape of the content vector artwork overlapped by each of the shapes of the style vector artwork. Additionally or alternatively, determining the fill content can include determining the color of the fill content from a color of the shape of the content vector artwork designated by the content vector artwork (e.g., an original color of the shape).

In one example, style map module 146 generates a first fill color map for the content vector artwork and a second fill color map for the style vector artwork. The fill color maps can be determined from style maps generated by style map module 146, such as by extracting fill colors at each point on a grid of a property map included in a style map. Determining the fill content can include determining a color of the fill content by applying a whitening transformation to the first color map, and applying a coloring transformation to results of the applying the whitening transformation so that the second color map and results of the applying the coloring transformation have matching covariance matrices.

Additionally or alternatively, determining the fill content can include determining an angle for a gradient vector in the style vector artwork, and mapping the angle to points in the stylized vector artwork. The fill content for the shape in the stylized vector artwork can be generated according to an additional gradient vector in the stylized vector artwork based on the points. The gradient can be applied to a fill color of a shape in the stylized vector artwork.

Figure 11:
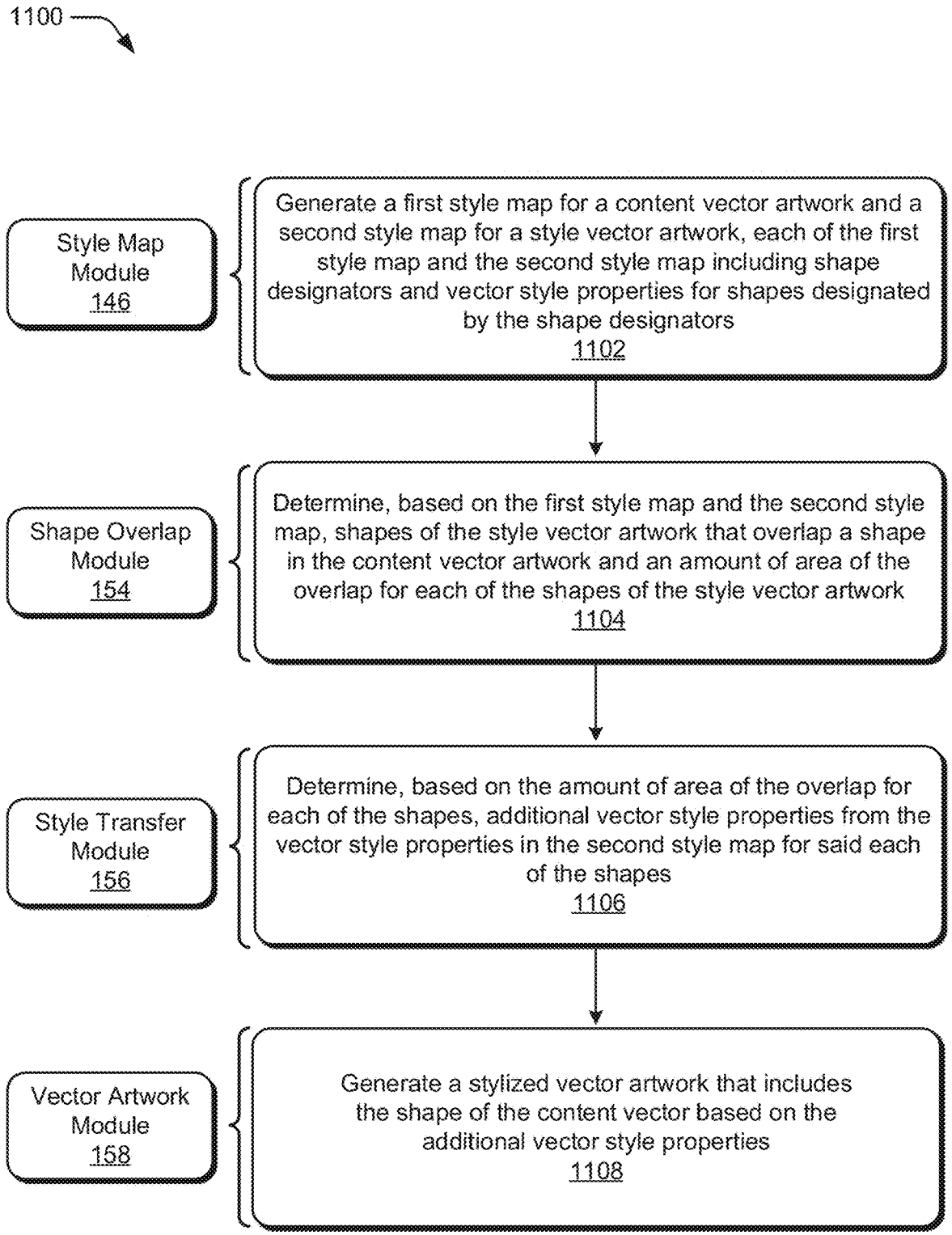
FIG. 11 illustrates a flow diagram depicting an example procedure in accordance with one or more aspects of the disclosure.

FIG. 11 illustrates an example procedure 1100 for transferring vector style properties to a vector artwork in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an artwork editing system, such as system 400 or artwork editing system 106. An artwork editing system implementing procedure 1100 may be an independent application that has been installed on the computing device, a service hosted by a service provider that is accessible by the computing device, a plug-in module to the computing device, or combinations thereof.

A first style map for a content vector artwork and a second style map for a style vector artwork are generated, each of the first style map and the second style map including shape designators and vector style properties for shapes designated by the shape designators (block 1102). In one example, style map module 146 generates a first style map for a content vector artwork and a second style map for a style vector artwork, each of the first style map and the second style map including shape designators and vector style properties for shapes designated by the shape designators. Style map module 146 may generate style maps by flattening curves of shapes to determine points on a grid belonging to shapes of a vector artwork with scanlines, and storing vector style properties with shape designators at each of the points.

Based on the first style map and the second style map, shapes of the style vector artwork that overlap a shape in the content vector artwork and an amount of area of the overlap for each of the shapes of the style vector artwork are determined (block 1104). In one example, shape overlap module 154 determines, based on the first style map and the second style map, shapes of the style vector artwork that overlap a shape in the content vector artwork and an amount of area of the overlap for each of the shapes of the style vector artwork. For instance, shape overlap module 154 may generate an overlap map representing shapes of the style vector artwork that overlap a shape in the content vector artwork and an amount of area of the overlap for each of the shapes of the style vector artwork.

Based on the amount of area of the overlap for each of the shapes, additional vector style properties are determined from the vector style properties in the second style map for each of the shapes (block 1106). In one example, style transfer module 156 determines, based on the amount of area of the overlap for each of the shapes, additional vector style properties from the vector style properties in the second style map for each of the shapes. In one example, the additional vector style properties include at least one of a fill color, a fill opacity, a fill pattern, a stroke width, a stroke color, a stroke opacity, a stroke dashing, gradient parameters, or properties for a shadow.

A stylized vector artwork that includes the shape of the content vector based on the additional vector style properties is generated (block 1108). In one example, vector artwork module 158 generates a stylized vector artwork that includes the shape of the content vector based on the additional vector style properties. Hence, the stylized vector artwork includes the shape of the content vector with a style based on the style vector artwork.

In one example, style transfer module 156 is configured to determine, based on the amount of area of the overlap for each of the shapes, a fill content of the additional vector style properties as one of a pattern, a gradient, or a solid fill according to a prioritized order of types of fill content that represent the pattern, the gradient, and the solid fill. In the prioritized order, a higher priority may be given to a gradient than a pattern or solid fill, and a lower priority may be given to the solid fill than the gradient or pattern. Vector artwork module 158 is configured to render the shape with the fill content in the stylized vector artwork.

In one example, vector artwork module 158 is configured to interpolate between one of the additional vector style properties and an original vector style property for the shape from the first style map to form an interpolated vector style property. The shape in the stylized vector artwork can be rendered based on the interpolated vector style property. For instance, a user may select a transfer percentage that determines how to interpolate between one of the additional vector style properties and the original vector style property. A transfer percentage of fifty percent (50%) may indicate to interpolate equally between the one of the additional vector style properties and the original vector style property.

Additionally or alternatively, for an additional shape of the content vector artwork in place of the shape, shape overlap module 154 can be configured to repeat to determine the shapes of the style vector artwork and the amount of area. Style transfer module 156 can be configured to repeat to determine the additional vector style properties. Vector artwork module 158 can be configured to repeat to generate the stylized vector artwork for the additional shape. For instance, for all shapes of the content vector artwork, shape overlap module 154 can be configured to repeat to determine the shapes of the style vector artwork and the amount of area, style transfer module 156 can be configured to repeat to determine the additional vector style properties, and vector artwork module 158 can be configured to repeat to generate the stylized vector artwork so that vector style properties are transferred from shapes of the style vector artwork to all shapes of the content vector artwork. Additionally or alternatively, vector style properties can be transferred from shapes of the style vector artwork to only user-designated shapes of the content vector artwork.

Figure 12:
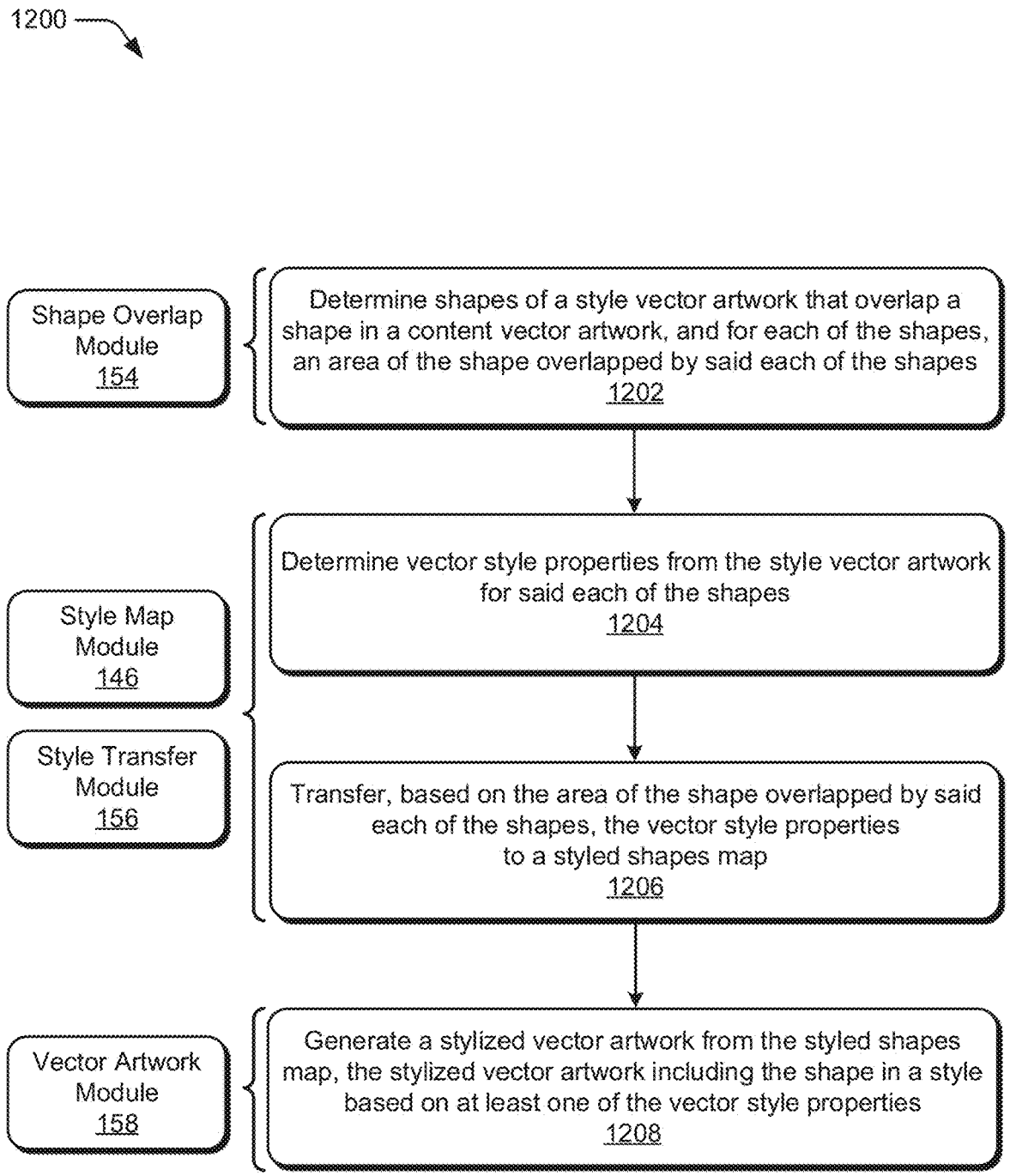
FIG. 12 illustrates a flow diagram depicting an example procedure in accordance with one or more aspects of the disclosure.

FIG. 12 illustrates an example procedure 1200 for transferring vector style properties to a vector artwork in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an artwork editing system, such as system 400 or artwork editing system 106. An artwork editing system implementing procedure 1200 may be an independent application that has been installed on the computing device, a service hosted by a service provider that is accessible by the computing device, a plug-in module to the computing device, or combinations thereof.

Shapes of a style vector artwork that overlap a shape in a content vector artwork are determined, and for each of the shapes, an area of the shape overlapped by each of the shapes is determined (block 1202). In one example, shape overlap module 154 determines shapes of a style vector artwork that overlap a shape in a content vector artwork, and for each of the shapes, an area of the shape overlapped by each of the shapes.

Vector style properties are determined from the style vector artwork for each of the shapes (block 1204). In one example, style map module 146 generates a style map for the style vector artwork, and style transfer module 156 determines vector style properties from the style map for each of the shapes designated as overlapping shapes in an overlap map generated by shape overlap module 154.

Based on the area of the shape overlapped by each of the shapes, the vector style properties are transferred to a styled shapes map (block 1206). In one example, style transfer module 156 transfers vector style properties from a style map generated by style map module 146 to a styled shapes map. Transferring can include combining the vector style properties for at least two of the shapes in proportion to the area of the shape overlapped by the at least two of the shapes.

A stylized vector artwork is generated from the styled shapes map, the stylized vector artwork including the shape in a style based on at least one of the vector style properties (block 1208). In one example, vector artwork module 158 generates a stylized vector artwork from the styled shapes map, the stylized vector artwork including the shape in a style based on at least one of the vector style properties.

The procedures described herein constitute an improvement over procedures that transfer style of one artwork to content of another artwork based on a neural network that processes raster graphics. Rather, the procedures described herein directly process vector artworks and produce vector artworks, and therefore retain the scalability advantages of vector graphics over raster graphics. Moreover, the procedures described herein do not rely on a neural network, but instead parse vector artworks to generate style maps for the vector artworks that are used to transfer vector style properties from one vector artwork to another vector artwork based on overlapping shapes in the vector artworks. Hence, the procedures described herein do not require a costly training stage that consumes time and computer resources to train a neural network, are not limited to seen classes of objects used in a training dataset for the neural network, and do not suffer from information loss and distortions common to procedures that use neural networks to transfer image style. Furthermore, the procedures described herein can operate in real time to transfer vector style properties from one vector artwork to another vector artwork, unlike procedures that introduce significant processing delay and thus preclude real-time operation. Moreover, the procedures described herein generate a user interface that allows a designer to select vector style properties to transfer from one vector artwork to another vector artwork, and a percentage of the vector style property that is transferred. Accordingly, a designer has the ability to transfer vector style properties of the designer's choice from one vector artwork to another vector artwork in a predictable and controllable fashion, unlike procedures that use a neural network having no control or observability for the designer.

Having considered example procedures in accordance with one or more implementations, consider now example systems and devices that can be utilized to practice the inventive principles described herein.

Example Systems and Devices

FIG. 13 illustrates an example system generally at 1300 that includes an example computing device 1302 that is representative of one or more computing systems and devices that may implement the various techniques described herein. This is illustrated through inclusion of artwork editing system 106, system 400, artwork editing application 142, and artwork editing support system 118, which operate as described above. Computing device 1302 may be, for example, a user computing device (e.g., computing device 104), or a server device of a service provider, (e.g., server 116). Furthermore, computing device 1302 may include an on-chip system, multiple computing devices, combinations thereof, or any other suitable computing device or computing system. Accordingly, FIG. 13 illustrates computing device 1302 as one or more of a tablet, a laptop computer, a smart phone, smart eye glasses, and a camera, though these examples are illustrative and in no way are meant to limit the type or number of devices included in computing device 1302.

The example computing device 1302 includes a processing system 1304, one or more computer-readable media 1306, and one or more I/O interfaces 1308 that are communicatively coupled to each other. Although not shown, computing device 1302 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1304 is representative of functionality to perform one or more operations using hardware. Accordingly, processing system 1304 is illustrated as including hardware elements 1310 that may be configured as processors, functional blocks, and so forth. This may include implementation in hardware as an application specific integrated circuit or other logic device formed using one or more semiconductors. Hardware elements 1310 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 124 in FIG. 1 are an example of processing system 1304.

Computer-readable storage media 1306 is illustrated as including memory/storage 1312. Storage 126 in FIG. 1 is an example of memory/storage included in memory/storage 1312. Memory/storage 1312 may include volatile media (such as random access memory (RAM)), nonvolatile media (such as read only memory (ROM), Flash memory, optical disks, magnetic disks, and so forth), or combinations thereof. Memory/storage 1312 may include fixed media (e.g., RAM, ROM, a fixed hard drive, and so on) as well as removable media (e.g., Flash memory, a removable hard drive, an optical disc, and so forth). Computer-readable media 1306 may be configured in a variety of other ways as further described below.

Input/output interfaces 1308 are representative of functionality to allow a user to enter commands and information to computing device 1302, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1302 may be configured in a variety of ways as further described below to support user interaction.

Computing device 1302 also includes applications 1314. Applications 1314 are representative of any suitable applications capable of running on computing device 1302, and may include a web browser which is operable to access various kinds of web-based resources (e.g., assets, media clips, images, content, configuration files, services, user profiles, and the like). Applications 1314 include artwork editing application 142, as previously described. Furthermore, applications 1314 includes any applications supporting artwork editing system 106, system 400, and artwork editing support system 118.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1302. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1310, or combinations thereof. Computing device 1302 may be configured to implement particular instructions and functions corresponding to the software and hardware modules. Accordingly, implementation of a module that is executable by computing device 1302 as software may be achieved at least partially in hardware, e.g., through use of computer-readable storage media and hardware elements 1310 of processing system 1304. The instructions and functions may be executable/operable by one or more articles of manufacture (for example, one or more computing devices such as computing device 1302 or processing systems such as processing system 1304) to implement techniques, modules, and examples described herein.

The techniques described herein may be supported by various configurations of computing device 1302 and are not limited to the specific examples of the techniques described herein. This functionality may also be implemented all or in part through use of a distributed system, such as over a "cloud" 1316 via a platform 1318 as described below.

Cloud 1316 includes and is representative of a platform 1318 for resources 1320. Platform 1318 abstracts underlying functionality of hardware (e.g., servers) and software resources of cloud 1316. Resources 1320 may include applications, data, or applications and data that can be utilized while computer processing is executed on servers that are remote from computing device 1302. Resources 1320 can also include services provided over the Internet, through a subscriber network, such as a cellular or Wi-Fi network, or combinations thereof. Resources 1320 can include asset store 1322, which stores assets, such as vector artworks, images, photographs (e.g., user images in a gallery, a database of stock photographs, and the like), documents, user profile data, user image libraries, photographs posted in a shared photo service, animation sequences, videos, digital images (e.g., content images and style images), metadata of assets, datasets of images or artworks, and the like, and may be accessed by computing device 1302.

Platform 1318 may abstract resources and functions to connect computing device 1302 with other computing devices. Platform 1318 may also serve to abstract scaling of resources to provide a corresponding level of scale to encountered demand for resources 1320 that are implemented via platform 1318. Accordingly, in an interconnected device embodiment, implementation of functionality described herein may be distributed throughout system 1300. For example, the functionality may be implemented in part on computing device 1302 as well as via platform 1318 that abstracts the functionality of cloud 1316.

Conclusion

In one or more implementations, a digital medium environment includes at least one computing device. Systems, devices, and techniques are described herein for transferring vector style properties to a vector artwork efficiently, predictably, and quickly. An artwork editing system directly processes artwork represented by vector graphics to transfer vector style properties from one vector artwork to another vector artwork, unlike conventional systems that process raster graphics. The artwork editing system generates style maps for a content vector artwork and a style vector artwork, and uses the style maps to transfer vector style properties from shapes of the style vector artwork to shapes of the content vector artwork based on overlapping shapes between the two artworks. The vector style properties transferred to the content vector artwork may be in proportion to the amount of area of the overlap. The artwork editing system includes a user interface that allows a user to select vector style properties to transfer to a vector artwork, such as fill content, stroke color, stroke width, stroke dashing, and the like, and a percentage of the vector style property that is transferred. Accordingly, the artwork editing system allows a designer to transfer vector style properties of the designer's selection to a vector artwork efficiently and predictably, in real-time (e.g., without perceptible delay to the designer), without undesired distortions that are commonly introduced by neural networks, and without the cost associated with neural networks.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

The invention claimed is:

1. A method implemented by a computing device in a digital medium environment for editing digital images represented by vector-based graphics, the computing device executing an image editing application to perform the method comprising:
    determining style image shapes depicted in a style image that overlap a content image shape depicted in a content image based on a virtual overlay of the style image on the content image;
    determining an area of the content image shape that is overlapped by one or more of the style image shapes;
    determining one or more style properties of the style image shapes to apply to the content image shape based on the area of the content image shape that is overlapped by the one or more style image shapes; and
    generating a stylized image with the content image shape having an appearance that includes the one or more style properties of the style image shapes applied to the content image shape.

2. The method as recited in claim 1, further comprising:
    determining fill colors of the style image shapes depicted in the style image; and
    wherein the generating the stylized image includes applying a fill color of a style image shape to change the appearance of the content image shape.

3. The method as recited in claim 2, wherein the applying the fill color to change the appearance of the content image shape is based on the style image shape with the most area of the one or more style image shapes overlapping the content image shape.

4. The method as recited in claim 2, further comprising:
receiving a style selection input in a user interface of the image editing application, the style selection input received as a fill color opacity to apply to the content image; and
wherein the applying the fill color to change the appearance of the content image shape includes applying the fill color opacity to the fill color.

5. The method as recited in claim 1, further comprising:
determining fill colors of the style image shapes depicted in the style image; and
wherein the generating the stylized image includes applying one or more of the fill colors of the style image shapes to change the appearance of the content image shape, the one or more of the fill colors applied in proportion to the area of the content image shape that is overlapped by the one or more style image shapes.

6. The method as recited in claim 1, further comprising:
receiving a style selection input in a user interface of the image editing application, the style selection input received as a stroke width of a style image shape to apply to the content image;
extracting a style property as the stroke width of the style image shape depicted in the style image; and
wherein the generating the stylized image includes the content image shape having the appearance including the stroke width applied as at least one of the style properties.

7. The method as recited in claim 1, further comprising:
receiving a style selection input in a user interface of the image editing application, the style selection input received as a stroke dash style of a style image shape to apply to the content image;
extracting a style property as the stroke dash style of the style image shape depicted in the style image; and
wherein the generating the stylized image includes the content image shape having the appearance including the stroke dash style applied as at least one of the style properties.

8. The method as recited in claim 1, further comprising:
receiving a style selection input in a user interface of the image editing application, the style selection input received as a stroke color of a style image shape to apply to the content image;
extracting a style property as the stroke color of the style image shape depicted in the style image; and
wherein the generating the stylized image includes the content image shape having the appearance including the stroke color applied as at least one of the style properties.

9. The method as recited in claim 1, wherein the one or more style properties include fill content, the method further comprising determining the fill content of the style image shapes to apply to the content image shape, including one of:
determining the fill content as a pattern from one of the style image shapes;
determining the fill content as a gradient from one of the style image shapes; or
determining the fill content as a solid fill from one of the style image shapes.

10. The method as recited in claim 9, wherein the determining the fill content is according to a prioritized order from the pattern to the gradient to the solid fill.

11. An image editing system implemented by a computing device in a digital medium environment, the image editing system including modules executed at least partially by a processor of the computing device, the image editing system comprising:
a style map module to map style image shapes depicted in a style image, and map content image shapes depicted in a content image;
a shape overlap module to determine an area of a content image shape that is overlapped by one or more of the style image shapes based on a virtual overlay of the style image on the content image;
a style transfer module to determine one or more style properties of the style image shapes to apply to the content image shape based on the area of the content image shape that is overlapped by the one or more style image shapes; and
a vector module to generate a stylized image with the content image shape having an appearance that includes the one or more style properties of the style image shapes applied to the content image shape.

12. The image editing system as recited in claim 11, wherein the style transfer module is configured to determine, based on the area of the content image shape that is overlapped, a fill content as a style property of the style image shapes to apply to the content image shape, the fill content determined as one of a pattern, a gradient, or a solid fill.

13. The image editing system as recited in claim 11, wherein:
the style transfer module is configured to determine fill colors of the style image shapes depicted in the style image; and
the vector module is configured to generate the stylized image by applying a fill color of a style image shape to change the appearance of the content image shape.

14. The image editing system as recited in claim 13, wherein the vector module is configured to apply the fill color of the style image shape to change the appearance of the content image shape based on the style image shape with the most area of the one or more style image shapes overlapping the content image shape.

15. The image editing system as recited in claim 11, further comprising:
a user interface module to generate a user interface for display and receive a style selection input as a fill color opacity to apply to the content image; and
wherein the vector module is configured to apply the fill color opacity to the fill color to change the appearance of the content image shape.

16. The image editing system as recited in claim 11, wherein:
the style transfer module is configured to determine fill colors of the style image shapes depicted in the style image; and
the vector module is configured to generate the stylized image by applying one or more of the fill colors of the style image shapes to change the appearance of the content image shape, the one or more of the fill colors applied in proportion to the area of the content image shape that is overlapped by each of the style image shapes.

17. An image editing system implemented by a computing device in a digital medium environment, the image editing system including modules executed at least partially by a processor of the computing device, the image editing system comprising:

a user interface module to generate a user interface for display and receive style selection inputs of one or more style properties of a style image to apply to a content image;

a shape overlap module to determine an area of a content image shape depicted in the content image that is overlapped by one or more style image shapes depicted in the style image;

a style transfer module to transfer the one or more style properties of the one or more style image shapes that overlap the content image shape; and the user interface module to initiate a display of a stylized image with the content image shape having an appearance that includes the one or more style properties of the one or more style image shapes transferred to the content image shape.

18. The image editing system as recited in claim 17, wherein the style transfer module is configured to transfer the one or more style properties of the one or more style image shapes that overlap the content image shape based on the area of the content image shape that is overlapped by the one or more style image shapes.

19. The image editing system as recited in claim 18, wherein the one or more style properties of the one or more style image shapes that transfer to the content image shape include one or more of a stroke width of a style image shape, a stroke dash style of a style image shape, and a stroke color of a style image shape.

20. The image editing system as recited in claim 17, wherein the style transfer module is configured to transfer a combination of style properties from at least two of the style image shapes to the content image shape in proportion to the area of the content image shape overlapped by the at least two of the style image shapes.

* * * * *